(12) United States Patent
Koseoglu et al.

(10) Patent No.: US 11,248,173 B2
(45) Date of Patent: Feb. 15, 2022

(54) PROCESS AND SYSTEM FOR CATALYTIC CONVERSION OF AROMATIC COMPLEX BOTTOMS

(71) Applicant: Saudi Arabian Oil Company, Dhahran (SA)

(72) Inventors: Omer Refa Koseoglu, Dhahran (SA); Robert Peter Hodgkins, Dhahran (SA); Frederick Marie Adam, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 50 days.

(21) Appl. No.: 16/790,539

(22) Filed: Feb. 13, 2020

(65) Prior Publication Data

US 2021/0261869 A1 Aug. 26, 2021

(51) Int. Cl.
| | | |
|---|---|---|
| *C10G 11/18* | (2006.01) | |
| *B01D 3/14* | (2006.01) | |
| *B01J 8/18* | (2006.01) | |
| *B01J 19/24* | (2006.01) | |
| *C10G 51/02* | (2006.01) | |

(Continued)

(52) U.S. Cl.
CPC ............... *C10G 11/18* (2013.01); *B01D 3/14* (2013.01); *B01J 8/1827* (2013.01); *B01J 19/245* (2013.01); *C10G 51/026* (2013.01); *C10G 57/005* (2013.01); *C10G 69/04* (2013.01); *B01J 2219/0004* (2013.01); *C10G 2300/107* (2013.01); *C10G 2300/1077* (2013.01); *C10G 2300/301* (2013.01); *C10G 2300/305* (2013.01); *C10G 2300/307* (2013.01); *C10G 2300/308* (2013.01); *C10G 2400/02* (2013.01); *C10G 2400/04* (2013.01); *C10G 2400/20* (2013.01)

(58) Field of Classification Search
CPC .... C10G 11/18; C10G 51/026; C10G 57/005; C10G 69/04; C10G 2300/301; C10G 2300/305; C10G 2300/307; C10G 2300/308; C10G 2300/107; C10G 2300/1077; C10G 2400/02; C10G 2400/04; C10G 2400/20; B01J 8/1827; B01J 19/245; B01J 2219/0004; B01D 3/14

See application file for complete search history.

(56) References Cited

U.S. PATENT DOCUMENTS

| | | | |
|---|---|---|---|
| 2,301,391 A | 11/1942 | Frey | |
| 2,373,501 A | 4/1945 | Peterson | |

(Continued)

FOREIGN PATENT DOCUMENTS

| | | |
|---|---|---|
| CA | 1137118 A1 | 12/1982 |
| CA | 1168647 A1 | 6/1984 |
| CA | 2356632 A1 | 6/2000 |

OTHER PUBLICATIONS

Gary, J.H. et al. (2007) Petroleum Refining Technology and Economics, 5th edition, CRC Press, 465 pgs [Office action cites p. 208].*

(Continued)

*Primary Examiner* — Brian A McCaig
(74) *Attorney, Agent, or Firm* — Leason Ellis LLP

(57) ABSTRACT

Processes and systems are disclosed for improving the yield from reforming processes. Aromatic complex bottoms, or a heavy fraction thereof, are subjected to catalytic conversion to produce additional gasoline and higher-quality aromatic compounds.

31 Claims, 6 Drawing Sheets

(51) Int. Cl.
  *C10G 57/00* (2006.01)
  *C10G 69/04* (2006.01)

(56) References Cited

U.S. PATENT DOCUMENTS

| | | | |
|---|---|---|---|
| 2,389,713 A | 11/1945 | Atwell | |
| 3,172,842 A | 3/1965 | Paterson | |
| 3,197,518 A | 7/1965 | Chapman et al. | |
| 3,435,084 A | 3/1969 | Cabbage et al. | |
| 3,591,651 A | 7/1971 | Carr et al. | |
| 3,617,494 A | 11/1971 | Montgomery | |
| 3,625,879 A | 12/1971 | Horne et al. | |
| 3,836,344 A | 9/1974 | Krawitz et al. | |
| 4,022,681 A | 5/1977 | Sheng et al. | |
| 4,066,531 A * | 1/1978 | Owen | C10G 11/18 208/120.1 |
| 4,078,990 A | 3/1978 | Brennan et al. | |
| 4,211,886 A | 7/1980 | Tabak et al. | |
| 4,300,008 A | 11/1981 | McCauley | |
| 4,382,851 A | 5/1983 | Angevine et al. | |
| 4,645,585 A | 1/1987 | White | |
| 5,004,853 A | 4/1991 | Barger et al. | |
| 5,149,894 A | 9/1992 | Holtermann et al. | |
| 5,189,233 A | 2/1993 | Larkin et al. | |
| 5,210,333 A | 5/1993 | Bellows et al. | |
| 5,294,334 A | 3/1994 | Kaul et al. | |
| 5,382,734 A | 1/1995 | Sardar et al. | |
| 5,773,670 A | 6/1998 | Gilbert et al. | |
| 5,830,345 A | 11/1998 | Lee et al. | |
| 5,856,602 A | 1/1999 | Gilbert et al. | |
| 5,871,618 A * | 2/1999 | Lee | C10M 175/0033 196/46.1 |
| 6,187,980 B1 | 2/2001 | Gilbert | |
| 6,187,987 B1 | 2/2001 | Chin et al. | |
| 6,448,436 B1 | 9/2002 | Kreitman et al. | |
| 6,958,425 B1 | 10/2005 | Bogdan et al. | |
| 7,091,390 B2 | 8/2006 | Jan et al. | |
| 7,638,667 B2 | 12/2009 | Jan et al. | |
| 7,687,423 B2 | 3/2010 | Moscoso et al. | |
| 7,745,678 B2 | 6/2010 | Jan et al. | |
| 8,927,800 B2 | 1/2015 | Mahieux et al. | |
| 9,145,522 B2 | 9/2015 | Negiz et al. | |
| 9,221,036 B2 | 12/2015 | Koseoglu et al. | |
| 9,283,553 B2 | 3/2016 | Kim et al. | |
| 9,328,299 B2 | 5/2016 | Funk et al. | |
| 9,382,173 B2 | 7/2016 | Yanagawa et al. | |
| 9,862,898 B2 | 1/2018 | Ward et al. | |
| 10,053,401 B1 | 8/2018 | Beadle et al. | |
| 10,081,009 B2 | 9/2018 | Koseoglu et al. | |
| 10,093,873 B2 | 10/2018 | Koseoglu et al. | |
| 10,357,761 B2 | 7/2019 | Koseoglu et al. | |
| 2013/0240406 A1 | 9/2013 | Sadler et al. | |
| 2015/0284644 A1 | 10/2015 | Fanget et al. | |
| 2016/0045841 A1 | 2/2016 | Kalpan et al. | |
| 2017/0009156 A1 | 1/2017 | Pelaez | |

OTHER PUBLICATIONS

Kari Vahteristo, Kinetic Modeling of Mechanisms of Industrially Important Organic Reactions in Gas and Liquid Phase, (2010) Lappeenranta University of Technnology (Acta Universitatis Lappeenrantaensis 402).

Tung-Hsiung Kuo and Chuei-Tin Chang, Application of Mathematic Programming Model for Integrated Planning and Scheduling of Petroleum Supply Networks, Industrial & Engineering Chemistry Research (2008), vol. 47, No. 6, pp. 1935-1954.

G. C. Laredo, P. Pérez-Romo, J. Escobar, J. L. Garcia-Gutierrez, and P. M. Vega-Merino, Light Cycle Oil Upgrading to Benzene, Toluene, and Xylenes by Hydrocracking: Studies Using Model Mixtures, Industrial & Engineering Chemistry Research (2017), vol. 56, No. 39, pp. 10939-10948.

M. Chareonpanich, Z.-G. Zhang, and A. Tomita, Hydrocracking of aromatic hydrocarbons over USY-zeolite, Energy & Fuels (1996), vol. 10, No. 4, pp. 927-931.

PCT International Search Report and Written Opinion from corresponding PCT Application No. PCT/US2021/016275 dated May 12, 2021.

* cited by examiner

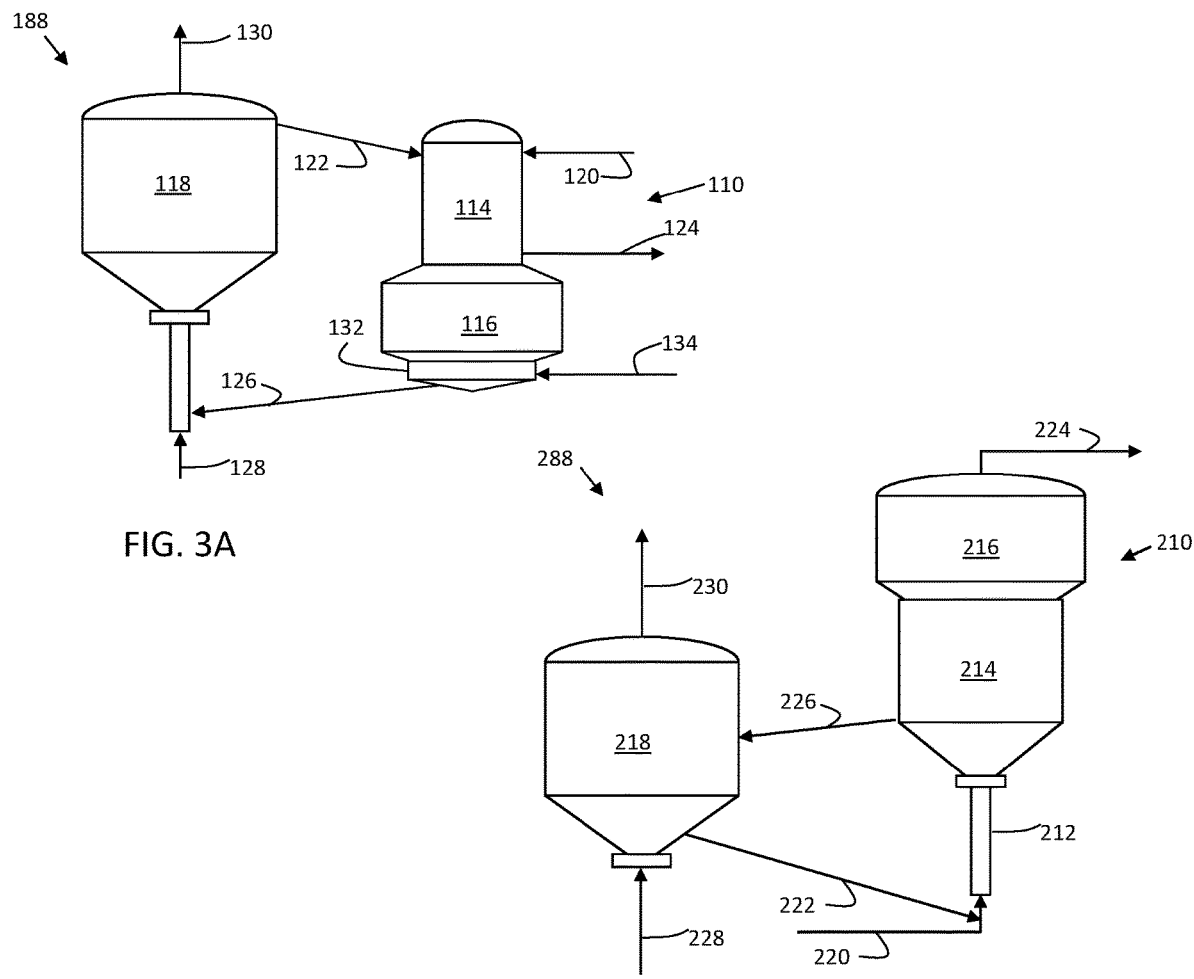
FIG. 3A
FIG. 3B
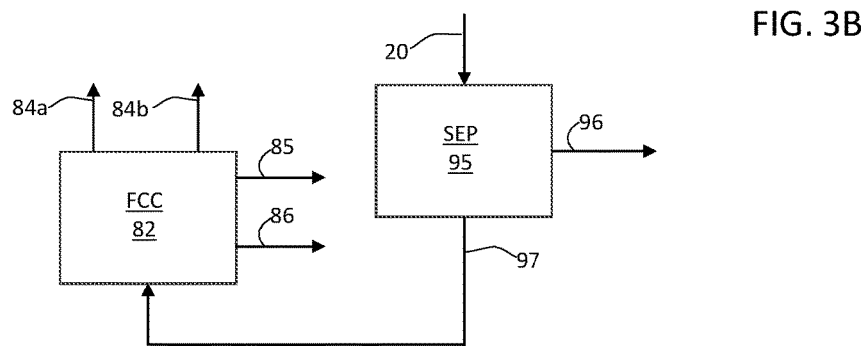
FIG. 4

PROCESS AND SYSTEM FOR CATALYTIC CONVERSION OF AROMATIC COMPLEX BOTTOMS

RELATED APPLICATIONS

Not applicable.

BACKGROUND OF THE INVENTION

Field of the Invention

This disclosure relates to catalytic reforming and aromatics recovery processes integrating conversion of aromatic complex bottoms including heavy alkylated aromatics into aromatic products and/or gasoline blending components.

Description of Related Art

Catalytic reformers are used in refineries to produce reformate, which is used as an aromatic rich gasoline blending fraction, and/or is used as feedstock to produce aromatic products. Due to stringent fuel specifications currently implemented or set for implementation worldwide, for example, requiring a level of ≤35 V % aromatics and a level of ≤1 V % benzene in gasoline, the reformate fraction is further treated to reduce its aromatics content. Treatment options for reduction of aromatics content include benzene hydrogenation and aromatics extraction. In benzene hydrogenation, the reformate is selectively hydrogenated to reduce the benzene content, and the total aromatics content is reduced by blending, if necessary.

In some refineries, naphtha is reformed after hydrodesulfurization to increase the octane content of the gasoline. Reformate contains a high level of benzene which must be reduced in order to meet requisite fuel specifications that are commonly in the range of from about 1-3 V % benzene, with certain geographic regions targeting a benzene content of less than 1 V %. Catalytic reforming, which involves a variety of reactions in the presence of one or more catalysts and recycle and make-up hydrogen, is a widely used process for refining hydrocarbon mixtures to increase the yield of higher octane gasoline. However, benzene yields can be as high as 10 V % in reformates. There currently exist methods to remove benzene from reformate, including separation processes and hydrogenation reaction processes. In separation processes, benzene is extracted with a solvent and then separated from the solvent in a membrane separation unit or other suitable unit operation. In hydrogenation reaction processes, the reformate is divided into fractions to concentrate the benzene, and then one or more benzene-rich fractions are hydrogenated.

In catalytic reforming, a naphtha stream is first hydrotreated in a hydrotreating unit to produce a hydrotreated naphtha stream. The hydrotreating unit operates according to certain conditions, including temperature, pressure, hydrogen partial pressure, liquid hourly space velocity (LHSV), and catalyst selection and loading, which are effective to remove at least enough sulfur and nitrogen to meet requisite product specifications. For instance, hydrotreating in conventional naphtha reforming systems generally occurs under relatively mild conditions that are effective to remove sulfur and nitrogen to less than 0.5 ppmw levels.

The hydrotreated naphtha stream is reformed in a reforming unit to produce a gasoline reformate product stream. The reformate is sent to the gasoline pool to be blended with other gasoline components to meet the required specifications. Some gasoline blending pools include $C_4$ and heavier hydrocarbons having boiling points of less than about 205° C. In catalytic reforming processes, paraffins and naphthenes are restructured to produce isomerized paraffins and aromatics of relatively higher octane numbers. Catalytic reforming converts low octane n-paraffins to i-paraffins and naphthenes. Naphthenes are converted to higher octane aromatics. The aromatics are left essentially unchanged, or some may be hydrogenated to form naphthenes due to reverse reactions taking place in the presence of hydrogen. The reactions involved in catalytic reforming are commonly grouped into the four categories of cracking, dehydrocyclization, dehydrogenation, and isomerization. A particular hydrocarbon/naphtha feed molecule may undergo more than one category of reaction and/or may form more than one product.

There are several types of catalytic reforming process configurations which differ in the manner in which they regenerate the reforming catalyst to remove the coke formed in the reactors. Catalyst regeneration, which involves combusting detrimental coke in the presence of oxygen, includes a semi-regenerative process, cyclic regeneration, and continuous catalyst regeneration (CCR). Semi-regeneration is the simplest configuration, and the entire unit, including all reactors in the series, is shut-down for catalyst regeneration in all reactors. Cyclic configurations utilize an additional "swing" reactor to permit one reactor at a time to be taken off-line for regeneration while the others remain in service. Continuous catalyst regeneration configurations, which are the most complex, provide for essentially uninterrupted operation by catalyst removal, regeneration and replacement. While continuous catalyst regeneration configurations include the ability to increase the severity of the operating conditions due to higher catalyst activity, the associated capital investment is necessarily higher.

Reformate is usually sent to an aromatic complex (also referred to as an "aromatics recovery complex" or ARC) for extraction of the aromatics. Reformate generally undergoes several processing steps in an aromatic complex to recover high value products including xylenes and benzene. In addition lower value products, for example toluene, can be converted into higher value products. The aromatics present in reformate are typically separated into different fractions by carbon number, such as $C_6$ benzene, $C_7$ toluene, $C_8$ xylenes and ethylbenzene. The $C_8$ fraction is typically subjected to a processing scheme to produce high value para-xylene. Para-xylene is usually recovered in high purity from the $C_8$ fraction by separating the para-xylene from the ortho-xylene, meta-xylene, and ethylbenzene using selective adsorption or crystallization. The ortho-xylene and meta-xylene remaining from the para-xylene separation are isomerized to produce an equilibrium mixture of xylenes. The ethylbenzene is isomerized into xylenes or is dealkylated to benzene and ethane. The para-xylene is separated from the ortho-xylene and the meta-xylene, typically using adsorption or crystallization. The para-xylene-free stream is recycled to extinction to the isomerization unit, and in the para-xylene recovery unit ortho-xylene and meta-xylene are converted to para-xylene and recovered.

Toluene is recovered as a separate fraction, and then may be converted into higher value products, for example, benzene in addition to or in alternative to xylenes. One toluene conversion process involves the disproportionation of toluene to make benzene and xylenes. Another process involves the hydrodealkylation of toluene to produce benzene. Both toluene disproportionation and toluene hydrodealkylation result in the formation of benzene. With the current and future anticipated environmental regulations involving benzene, it is desirable that the toluene conversion does not result in the formation of significant quantities of benzene.

The aromatic complex produces a reject stream or bottoms stream that is very heavy (typically boiling higher than about 150° C.), which is not suitable as gasoline blending components. Maximum sulfur, aromatics, and benzene levels of about 10 ppmw, 35 V %, and 1 V % or less, respectively, have been targeted as goals by regulators.

A problem faced by refinery operators is how to most economically utilize the aromatic complex bottoms. In some refineries, the aromatic complex bottoms are added to the gasoline fraction. However, the aromatic complex bottoms deteriorate the gasoline quality and in the long run impact the engine performance negatively, and any portion not added to the gasoline fraction is considered process reject material. Therefore, a need exists for improved systems and processes for handling aromatic complex bottoms.

SUMMARY

The above objects and further advantages are provided by the systems and processes for treating aromatic complex bottoms streams disclosed herein. In a conventional aromatic complex for separating heavy reformate, BTX/BTEX is recovered, but up to 20% of the heavy reformate comprises material that is typically considered process reject material or bottoms.

In embodiments herein, systems and processes for treatment of $C_9+$ aromatic complex bottoms are provided. These are obtained from catalytic reforming of naphtha followed by separation in an aromatic complex into a gasoline pool stream, an aromatic products stream and the $C_9+$ aromatic complex bottoms. In certain embodiments, the process comprises reacting a feedstream comprising all or a portion of the $C_9+$, the $C_{10}+$ or the $C_{11}+$ aromatic bottoms in the presence of a catalyst under specified fluidized catalytic cracking reaction conditions generally to produce FCC naphtha, light olefins and cycle oil.

In certain embodiments, the process comprises separating all or a portion of the $C_9+$ aromatic bottoms into a tops fraction and a bottoms fraction; and reacting a feedstream comprising all or a portion of the bottoms fraction in the presence of a catalyst under specified fluidized catalytic cracking reaction conditions. A portion of the $C_9+$ aromatic bottoms can be subjected to fluidized catalytic cracking, bypassing separation. In certain embodiments all or a portion of the tops fraction is supplied to a reactor in the presence of a transalkylation catalyst and hydrogen under specified reaction conditions for transalkylation of aromatics to produce $C_8$ aromatic compounds.

In certain of the above embodiments, the aromatic complex includes a xylene rerun unit, and the feedstream to fluidized catalytic cracking and/or separation comprises $C_9+$ alkylaromatics from the xylene rerun unit. In certain of the above embodiments, the aromatic complex includes or is in fluid communication with a transalkylation zone for transalkylation of aromatics to produce $C_8$ aromatic compounds and $C_{11}+$ aromatic compounds, and the fluidized catalytic cracking feedstream comprises $C_{11}+$ aromatics from the transalkylation zone.

In certain of the above embodiments, the process further comprises passing all or a portion of the FCC naphtha to catalytic reforming, to the aromatic complex, or to a naphtha hydrotreating zone that precedes catalytic reforming. In certain of the above embodiments, the aromatic complex includes a reformate splitter operable to separate reformate into light reformate stream and a heavy reformate stream, and a heavy reformate splitter operable to separate heavy reformate into a $C_7$ stream and a $C_8+$ stream, and where the process further comprises passing all or a portion of the FCC naphtha stream to the heavy reformate splitter. In certain of the above embodiments, the process further comprises separating all or a portion of the FCC naphtha into an aromatics (BTX/BTEX) stream and additional gasoline or additional gasoline blending components.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The process of the present disclosure will be described in more detail below and with reference to the attached drawings in which:

FIG. 3A is a generalized diagram of a downflow fluidized catalytic cracking reactor system that can be integrated in the systems of FIGS. 2A and 2B;

FIG. 3B is a generalized diagram of a riser fluidized catalytic cracking reactor system that can be integrated in the systems of FIGS. 2A and 2B; and FIG. 4 is a schematic process flow diagram of a portion of a system used in examples of the present disclosure.

DETAILED DESCRIPTION

Figure 1A:
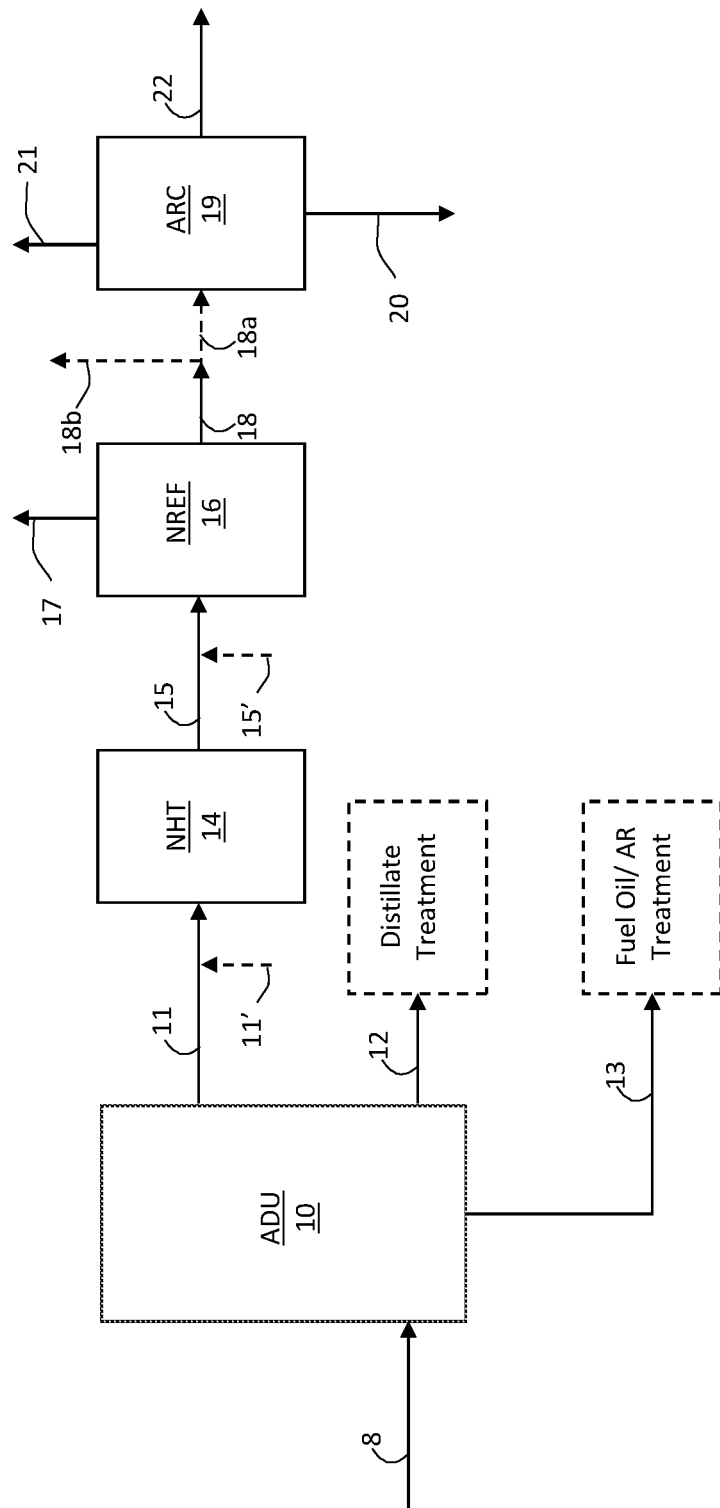
FIG. 1A is a schematic process flow diagram of a conventional system for gasoline and aromatic production.

As used herein, the term "stream" (and variations of this term, such as hydrocarbon stream, feedstream, product stream, and the like) may include one or more of various hydrocarbon compounds, such as straight chain, branched or cyclical alkanes, alkenes, alkadienes, alkynes, alkylaromatics, alkenyl aromatics, condensed and non-condensed di-, tri- and tetra-aromatics, and gases such as hydrogen and methane, C2+ hydrocarbons and further may include various impurities.

The term "zone" refers to an area including one or more equipment, or one or more sub-zones. Equipment may include one or more reactors or reactor vessels, heaters, heat exchangers, pipes, pumps, compressors, and controllers. Additionally, an equipment, such as reactor, dryer, or vessels, further may be included in one or more zones.

Volume percent or "V %" refers to a relative value at conditions of 1 atmosphere pressure and 15° C.

The phrase "a major portion" with respect to a particular stream or plural streams, or content within a particular stream, means at least about 50 W % and up to 100 W %, or the same values of another specified unit.

The phrase "a significant portion" with respect to a particular stream or plural streams, or content within a particular stream, means at least about 75 W % and up to 100 W %, or the same values of another specified unit.

The phrase "a substantial portion" with respect to a particular stream or plural streams, or content within a particular stream, means at least about 90, 95, 98 or 99 W % and up to 100 W %, or the same values of another specified unit.

The phrase "a minor portion" with respect to a particular stream or plural streams, or content within a particular stream, means from about 1, 2, 4 or 10 W %, up to about 20, 30, 40 or 50 W %, or the same values of another specified unit.

The modifying term "straight run" is used herein having its well-known meaning, that is, describing fractions derived directly from the atmospheric distillation unit, optionally subjected to steam stripping, without other refinery treatment such as hydroprocessing, fluid catalytic cracking or steam cracking. An example of this is "straight run naphtha" and its acronym "SRN" which accordingly refers to "naphtha" defined herein that is derived directly from the atmospheric distillation unit, optionally subjected to steam stripping, as is well known.

The term "naphtha" as used herein refers to hydrocarbons boiling in the range of about 20-220, 20-210, 20-200, 20-190, 20-180, 20-170, 32-220, 32-210, 32-200, 32-190, 32-180, 32-170, 36-220, 36-210, 36-200, 36-190, 36-180 or 36-170° C.

The term "light naphtha" as used herein refers to hydrocarbons boiling in the range of about 20-110, 20-100, 20-90, 20-88, 32-110, 32-100, 32-90, 32-88, 36-110, 36-100, 36-90 or 36-88° C.

The term "heavy naphtha" as used herein refers to hydrocarbons boiling in the range of about 90-220, 90-210, 90-200, 90-190, 90-180, 90-170, 93-220, 93-210, 93-200, 93-190, 93-180, 93-170, 100-220, 100-210, 100-200, 100-190, 100-180, 100-170, 110-220, 110-210, 110-200, 110-190, 110-180 or 110-170° C.

The term "diesel range distillates" as used herein relative to effluents from the atmospheric distillation unit or separation unit refers to middle and heavy distillate hydrocarbons boiling between the end point of the naphtha range and the initial point of the atmospheric residue, such as in the range of about 170-370, 170-360, 170-350, 170-340, 170-320, 180-370, 180-360, 180-350, 180-340, 180-320, 190-370, 190-360, 190-350, 190-340, 190-320, 200-370, 200-360, 200-350, 200-340, 200-320, 210-370, 210-210, 210-350, 210-340, 210-320, 220-370, 220-220, 220-350, 220-340 or 220-320° C.; sub-fractions of middle and heavy distillates include kerosene, diesel and atmospheric gas oil.

The term "atmospheric residue" and its acronym "AR" as used herein refer to the bottom hydrocarbons having an initial boiling point corresponding to the end point of the diesel range distillates, and having an end point based on the characteristics of the crude oil feed.

The term "reformate" as used herein refers to a mixture of hydrocarbons that are rich in aromatics, and are intermediate products in the production of chemicals and/or gasoline, and include hydrocarbons boiling in the range of about 30-220, 40-220, 30-210, 40-210, 30-200, 40-200, 30-185, 40-185, 30-170 or 40-170° C.

The term "light reformate" as used herein refers to hydrocarbons boiling in the range of about 30-110, 30-100, 30-90, 30-88, 40-110, 40-100, 40-90 or 40-88° C.

The term "heavy reformate" as used herein refers to hydrocarbons boiling in the range of about 90-220, 90-210, 90-200, 90-190, 90-180, 90-170, 93-220, 93-210, 93-200, 93-190, 93-180, 93-170, 100-220, 100-210, 100-200, 100-190, 100-180, 100-170, 110-220, 110-210, 110-200, 110-190, 110-180 or 110-170° C.

As used herein, the term "aromatic products" includes $C_6$-$C_8$ aromatics, such as benzene, toluene, mixed xylenes (commonly referred to as BTX), or benzene, toluene, ethylbenzene and mixed xylenes (commonly referred to as BTEX), and any combination thereof. These aromatic products (referred to in combination or in the alternative as BTX/BTEX for convenience herein) have a premium chemical value.

As used herein, the terms "aromatic complex bottoms" and "aromatic bottoms" are used interchangeably and include hydrocarbons that are derived from an aromatic complex. These include the heavier fraction of $C_9$+ aromatics such as $C_9$-$C_{16}$+ compounds, and include a mixture of compounds including di-aromatics, for example in the range of $C_{10}$-$C_{16}$+ aromatic components. For example, aromatic bottoms generally boil in the range of greater than about 110 or 150° C., in certain embodiments in the range of about 110-500, 150-500, 110-450 or 150-450° C.

The term "mixed xylenes" refers to a mixture containing one or more $C_8$ aromatics, including any one of the three isomers of di-methylbenzene and ethylbenzene.

FIG. 1A is a schematic process flow diagram of a typical system and process for conversion of naphtha into gasoline and aromatic products integrating a naphtha hydrotreating zone 14, a catalytic reforming zone 16 and an aromatic complex 19. The system is shown in the context of a refinery including an atmospheric distillation column 10 having one or more outlets discharging a naphtha fraction 11 such as straight run naphtha, one or more outlets discharging diesel range distillates, shown as stream 12, and one or more outlets discharging an atmospheric residue fraction 13.

Naphtha conversion includes the naphtha hydrotreating zone 14, the catalytic reforming zone 16, and the aromatic complex 19. The naphtha hydrotreating zone 14 includes one or more inlets in fluid communication with the naphtha fraction 11 outlet(s), and one or more outlets discharging a hydrotreated naphtha stream 15. The catalytic reforming zone 16 includes one or more inlets in fluid communication with the hydrotreated naphtha stream 15 outlet(s), one or more outlets discharging a hydrogen rich gas stream 17, and one or more outlets discharging a reformate stream 18. In certain embodiments, the source of naphtha that is passed to the naphtha hydrotreating zone 14 can include a source other than the naphtha fraction 11, which in certain embodiments is straight run naphtha. Such other sources, which can be used instead of or in conjunction with the naphtha fraction 11, are generally indicated in FIG. 1A as stream 11', and can be derived from one or more sources of naphtha such as a wild naphtha stream obtained from a hydrocracking operation, a coker naphtha stream obtained from thermal cracking operations, pyrolysis gasoline obtained from steam cracking operations, or FCC naphtha (which can be from the integrated FCC unit or from another FCC unit). In still further embodiments, any naphtha stream that has sufficiently low heteroatom content can be passed directly to the catalytic reforming zone 16, generally indicated in FIG. 1A as stream 15'.

In certain embodiments, a portion 18b of the reformate can optionally be used directly as a gasoline blending pool component. All of stream 18, or a portion 18a in embodiments where a portion 18b is drawn off as a gasoline blending pool component, is used as feed to the aromatic complex 19. In certain embodiments, the portion 18a can be a heavy reformate fraction and the portion 18b can be a light reformate fraction. The aromatic complex 19 includes one or more inlets in fluid communication with the outlet(s) discharging the reformate stream 18 or the portion 18a thereof, and includes one or more outlets discharging gasoline pool stream(s) 21, one or more outlets discharging aromatic products stream(s) 22, and one or more outlets discharging an aromatic bottoms stream 20 that contains $C_9+$ aromatic hydrocarbon compounds.

An initial feed such as crude oil stream 8 is distilled in the atmospheric distillation column 10 to recover a naphtha or a heavy naphtha fraction 11 such as straight run naphtha or straight run heavy naphtha, and other fractions including for instance one or more diesel range distillate fractions, shown as stream 12, and an atmospheric residue fraction 13. Typically stream 12 includes at least one or more middle and/or heavy distillate fractions that are treated, such as by hydrotreating. Such treatment is referred to in FIG. 1A as "distillate treatment," and can include one or more separate hydrotreating units to desulfurize and obtain a diesel fuel fraction meeting the necessary specifications (for instance, ≤10 ppm sulfur). The atmospheric residue fraction 13 is typically either used as fuel oil component or sent to other separation and/or conversion units to convert low value hydrocarbons to high value products, shown in FIG. 1A as "fuel oil/AR treatment.".

The stream(s) 11 and/or 11' are hydrotreated in the naphtha hydrotreating zone 14 in the presence of hydrogen to produce the hydrotreated stream 15. The naphtha hydrotreating zone 14 operates in the presence of an effective amount of hydrogen, which can be obtained from recycle within the naphtha hydrotreating zone 14, recycle reformer hydrogen 17 (not shown), and if necessary, make-up hydrogen (not shown). A suitable naphtha hydrotreating zone 14 can include systems based on commercially available technology. In certain embodiments the feedstream(s) 11 and/or 11' to the naphtha hydrotreating zone 14 comprises full range naphtha, and the full range of hydrotreated naphtha is passed to the catalytic reforming zone 16. In other embodiments, the feedstream(s) 11 and/or 11' to the naphtha hydrotreating zone 14 comprises heavy naphtha, and hydrotreated heavy naphtha is passed to the catalytic reforming zone 16. In further embodiments, the feedstream(s) 11 and/or 11' to the naphtha hydrotreating zone 14 comprises full range naphtha, the full range of hydrotreated naphtha is passed to a separator between the naphtha hydrotreating zone 14 and the catalytic reforming zone 16, and hydrotreated heavy naphtha is passed to the catalytic reforming zone 16.

The streams 15 and/or 15' are passed to the catalytic reforming zone 16, which operates as is known to improve its quality, that is, increase its octane number to produce a reformate stream 18. In addition, the hydrogen rich gas stream 17 is produced, all or a portion of which can optionally be used to meet the hydrogen demand of the naphtha hydrotreating zone 14 (not shown). The reformate stream 18 or a portion 18a thereof can be used as a feedstock for the aromatic complex 19. A portion 18b of stream 18 can optionally be used directly as a gasoline blending pool component, for instance 0-99, 0-95, 0-90, 0-80, 0-70, 0-60, 0-50, 0-40, 0-30, 0-20 or 0-10 V %. In the aromatic complex 19, a gasoline pool stream 21 is discharged. In certain embodiments the benzene content of the gasoline pool stream 21 is less than or equal to about 3 V % or about 1 V %. In addition, aromatic products are recovered as one or more stream(s) 22.

The naphtha hydrotreating zone 14 is operated under conditions, and utilizes catalyst(s), effective for removal of a significant amount of the sulfur and other known contaminants. Accordingly, the naphtha hydrotreating zone 14 subjects feed to hydrotreating conditions to produce a hydrotreated naphtha or hydrotreated heavy naphtha stream 15 effective as feed to the catalytic reforming zone 16. The naphtha hydrotreating zone 14 operates under conditions of, for example, temperature, pressure, hydrogen partial pressure, liquid hourly space velocity (LHSV), catalyst selection/loading that are effective to remove at least enough sulfur, nitrogen, olefins and other contaminants needed to meet requisite product specifications. For example, the naphtha hydrotreating zone 14 can be operated under conditions effective to produce a naphtha range stream that meets requisite product specifications regarding sulfur and nitrogen levels, for instance, a level of ≤0.5 ppmw, as is conventionally known. Effective naphtha hydrotreating reactor catalysts include those possessing hydrotreating functionality and which generally contain one or more active metal component of metals or metal compounds (oxides or sulfides) selected from the Periodic Table of the Elements IUPAC Groups 6-10. In certain embodiments, the active metal component is selected from the group consisting of Co, Ni, Mo, and combinations thereof. The catalyst used in the naphtha hydrotreating zone 14 can include one or more catalyst selected from Co/Mo, Ni/Mo and Co/Ni/Mo. Combinations of one or more of Co/Mo, Ni/Mo and Co/Ni/Mo, can also be used. In certain embodiments, Co/Mo hydrodesulfurization catalyst is suitable. The active metal component is typically deposited or otherwise incorporated on a support, such as amorphous or crystalline alumina, silica alumina, titania, zeolites, or combinations thereof. The combinations can be composed of different particles containing a single active metal species, or particles containing multiple active species.

The hydrotreated naphtha stream is treated in the catalytic reforming zone 16 to produce reformate 18. A suitable catalytic reforming zone 16 can include systems based on commercially available technology. In certain embodiments, all, a substantial portion or a significant portion of the hydrotreated naphtha stream 15 is passed to the catalytic reforming zone 16, and any remainder can be blended in a gasoline pool. Typically, within the catalytic reforming zone 16, reactor effluent, containing hot reformate and hydrogen, is cooled and passed to a separator for recovery of a hydrogen stream and a separator bottoms stream the hydrogen is split into a portion that is compressed and recycled within the reformer reactors, and an excess hydrogen stream 17. The separator bottoms stream is passed to a stabilizer column to produce a light end stream and a reformate stream. The light end stream can be recovered and combined with one or more other similar streams obtained in the refinery. The hydrogen stream 17 can be recovered and passed to other hydrogen users within the refinery, including the naphtha hydrotreating zone 14.

In general, operating conditions for reactor(s) in the catalytic reforming zone 16 include a temperature in the range of from about 400-560 or 450-560° C.; a pressure in the range of from about 1-50 or 1-20 bars; and a liquid hourly space velocity in the range of from about 0.5-10, 0.5-4, or 0.5-2 h$^{-1}$. The reformate is sent to the gasoline pool to be blended with other gasoline components to meet the required specifications. Cyclic and CCR process designs include online catalyst regeneration or replacement, and accordingly the lower pressure ranges as indicated above are suitable. For instance, CCRs can operate in the range of about 5 bar, while semi regenerative systems operate at the higher end of the above ranges, with cyclic designs typically operating at a pressure higher than CCRs and lower than semi regenerative systems.

An effective quantity of reforming catalyst is provided. Such catalysts include mono-functional or bi-functional reforming catalysts which generally contain one or more active metal component of metals or metal compounds (oxides or sulfides) selected from the Periodic Table of the Elements IUPAC Groups 8-10. A bi-functional catalyst has both metal sites and acidic sites. In certain embodiments, the active metal component can include one or more of Pt, Re, Au, Pd, Ge, Ni, Ag, Sn, Ir or halides. The active metal component is typically deposited or otherwise incorporated on a support, such as amorphous or crystalline alumina, silica alumina, titania, zeolites, or combinations thereof. In certain embodiments, Pt or Pt-alloy active metal components that are supported on alumina, silica or silica-alumina are effective as reforming catalyst. The hydrocarbon/naphtha feed composition, the impurities present therein, and the desired products will determine such process parameters as choice of catalyst(s), process type, and the like. Types of chemical reactions can be targeted by a selection of catalysts or operating conditions known to those of ordinary skill in the art to influence both the yield and selectivity of conversion of paraffinic and naphthenic hydrocarbon precursors to particular aromatic hydrocarbon structures.

Figure 1B:
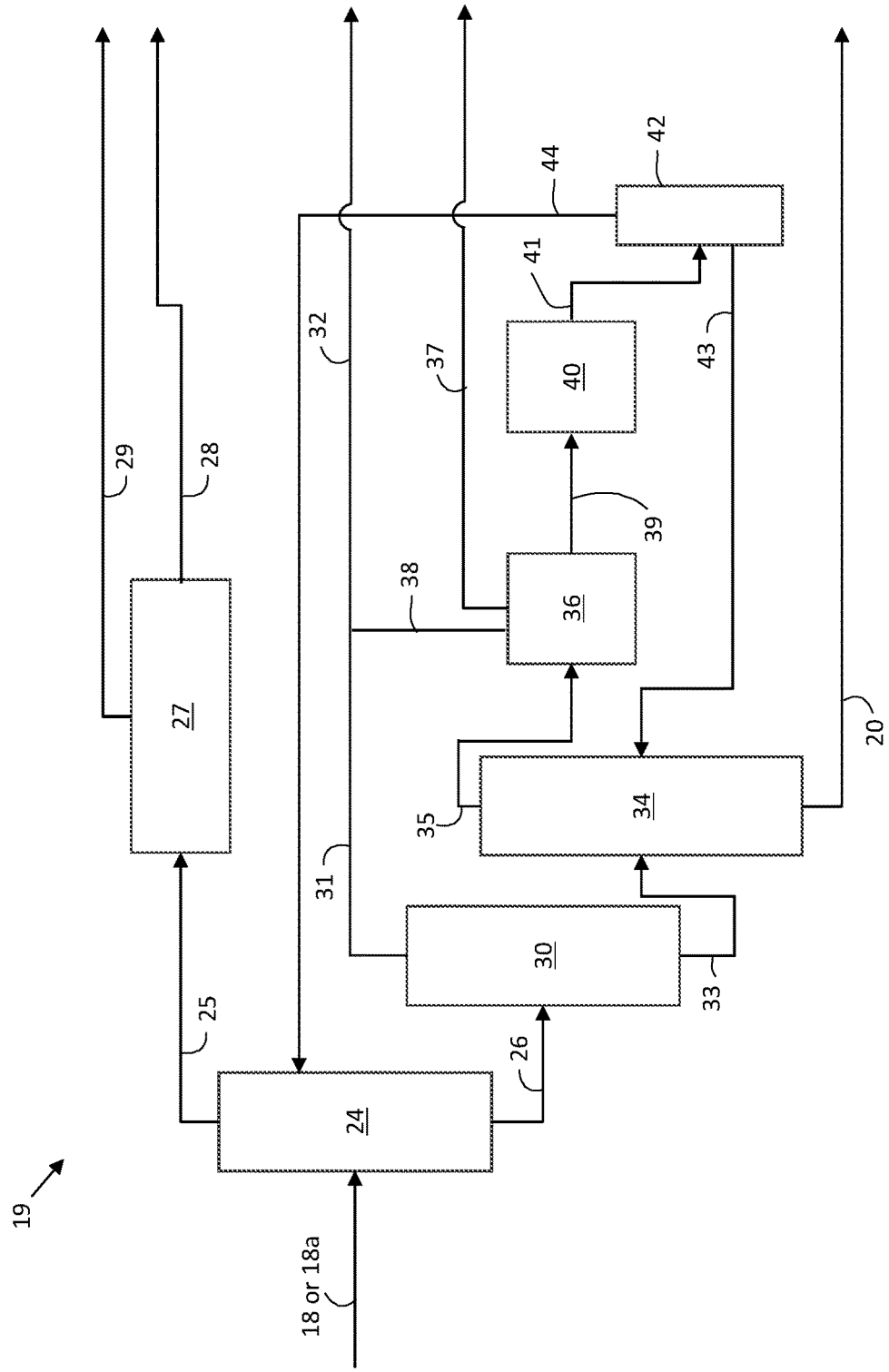
FIG. 1B is a schematic process flow diagram of a conventional aromatics recovery complex.

FIG. 1B is a schematic process flow diagram of a typical aromatic complex 19. The reformate stream 18 or a portion, stream 18a, is passed to the aromatic complex 19 to extract and separate the aromatic products, such as benzene and mixed xylenes, which have a premium chemical value, and to produce an aromatics and benzene free gasoline blending component. The aromatic complex produces a heavier fraction of $C_9+$ aromatics, stream 20, which is not suitable as a gasoline blending component stream.

In the aromatic complex described in conjunction with FIG. 1B, toluene may be included in the gasoline cut, but other embodiments are well known in which toluene is separated and/or further processed to produce other desirable products. For instance, toluene along with $C_9+$ hydrocarbon compounds can be subjected to transalkylation to produce ethylbenzene and mixed xylenes, as disclosed in U.S. Pat. No. 6,958,425, which is incorporated herein by reference.

A reformate stream 18 or portion 18a from the catalytic reforming unit 16 is divided into a light reformate stream 25 and a heavy reformate stream 26 in a reformate splitter 24. The light reformate stream 25, containing $C_5/C_6$ hydrocarbons, is sent to a benzene extraction unit 27 to extract a benzene product stream 28 and to recover a gasoline component stream 29 containing non-aromatic $C_5/C_6$ compounds, raffinate motor gasoline, in certain embodiments which is substantially free of benzene. The heavy reformate stream 26, containing $C_7+$ hydrocarbons, is routed to a heavy reformate splitter 30, to recover a $C_7$ component 31 that forms part of a $C_7$ gasoline product stream 32, and a $C_8+$ hydrocarbon stream 33.

The $C_8+$ hydrocarbon stream 33 is routed to a xylene rerun unit 34, where it is separated into a $C_8$ hydrocarbon stream 35 and a heavier $C_9+$ aromatic hydrocarbon stream 20 (for instance which corresponds to the aromatic bottoms stream/$C_9+$ hydrocarbon stream 20 described in FIG. 1A). The $C_8$ hydrocarbon stream 35 is routed to a para-xylene extraction unit 36 to recover a para-xylene product stream 37. Para-xylene extraction unit 36 also produces a $C_7$ cut mogas stream 38, which can be combined with $C_7$ cut mogas stream 31 to produce the $C_7$ cut mogas stream 32. A stream 39 of other xylenes (that is, ortho- and meta-xylenes) is recovered and sent to a xylene isomerization unit 40 to produce additional para-xylene, and an isomerization effluent stream 41 is sent to a splitter column 42. A $C_8+$ hydrocarbon stream 43 is recycled back to the para-xylene extraction unit 36 from the splitter column 42 via the xylene rerun unit 34. Splitter tops, $C_7-$ hydrocarbon stream 44, is recycled back to the reformate splitter 24. The heavy fraction 20 from the xylene rerun unit 34 is the aromatic bottoms stream that is conventionally recovered as process reject, corresponding to stream 20 in FIG. 1A. In certain embodiments, the streams 29 and 32 form the gasoline pool stream 21 as in FIG. 1A, and streams 28 and 37 form the aromatic products streams 22.

Figure 1C:
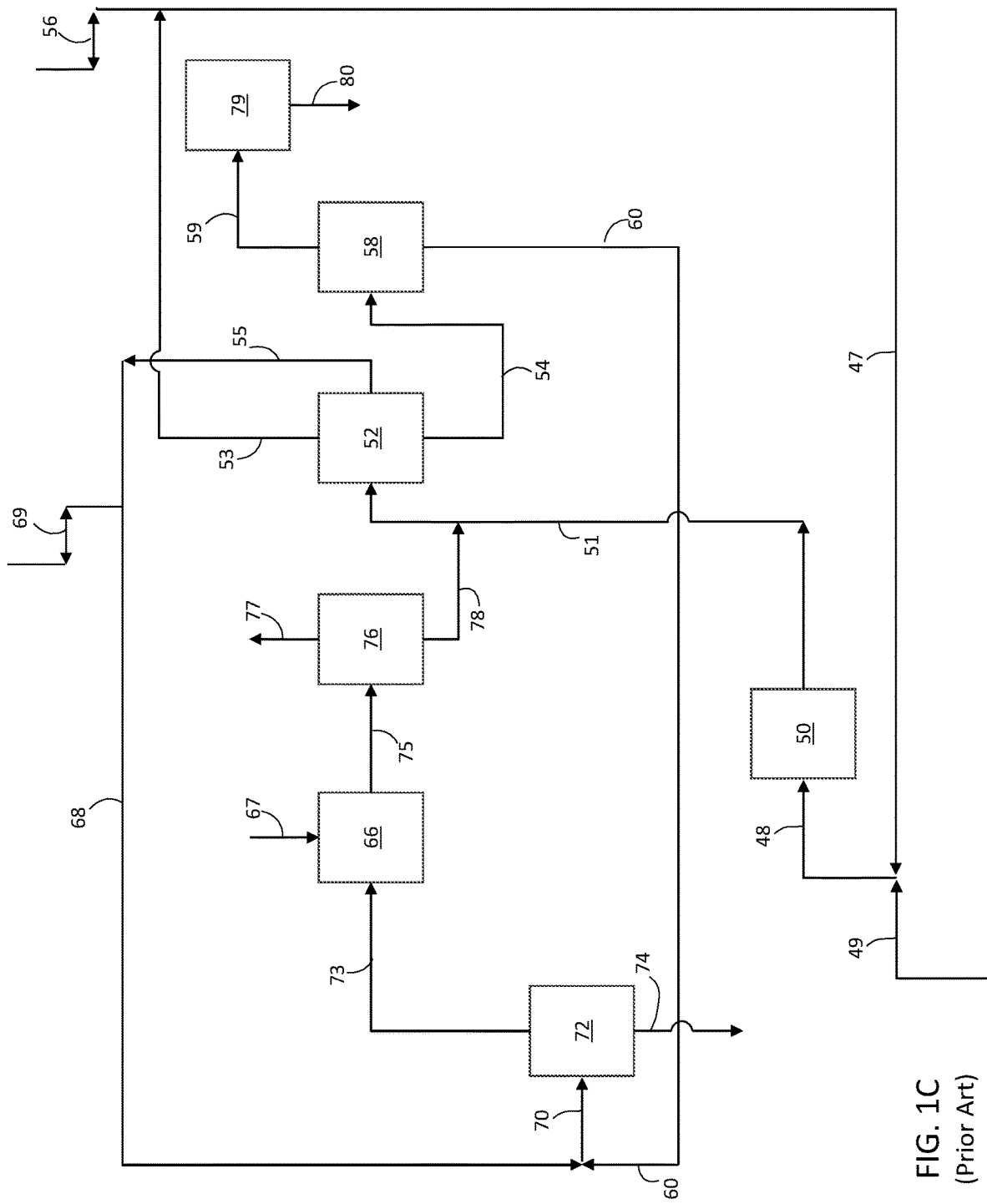
FIG. 1C is a schematic process flow diagram of a conventional system for aromatic transalkylation.

FIG. 1C is a schematic process flow diagram of a transalkylation/toluene disproportionation zone for aromatic transalkylation of $C_9+$ aromatics into $C_8$ aromatics ethylbenzene and xylenes, for instance similar to that disclosed in U.S. Pat. No. 6,958,425. In general, the units of the transalkylation/toluene disproportionation zone operate under conditions and in the presence of catalyst(s) effective to disproportionate toluene and $C_9+$ aromatics. Benzene and/or toluene can be supplied from the integrated system and processed herein or externally as needed. While an example of a transalkylation/toluene disproportionation zone is show in FIG. 1C, it is understood that other processes can be used and integrated within the system and process herein for catalytic conversion of aromatic complex bottoms.

A $C_9+$ alkylaromatics feedstream 49 for transalkylation can be all or a portion of stream 20 from the aromatic complex (for instance from the xylene rerun unit). In certain embodiments the stream 49 can be a tops fraction 96 as shown and described in conjunction with FIG. 2A described herein. In additional embodiments, stream 49 can include all or a portion of products from an aromatic complex bottoms treatment zone, such as the FCC gasoline and aromatic products stream 85. In the process, a $C_9+$ alkylaromatics stream 49 is admixed with a benzene stream 47 to form a combined stream 48 as the feed to a first transalkylation reactor 50 (optionally also including an additional hydrogen stream). After contact with a suitable transalkylation catalyst such as a zeolite material, a first transalkylation effluent stream 51 is produced and passed to a first separation column 52. The separation column 52, which also receives a second transalkylation effluent stream 78, separates the combined stream into an overhead benzene stream 53; a $C_8+$ aromatics bottoms stream 54 including ethylbenzene and xylenes; and a side-cut toluene stream 55. The overhead benzene stream 53 is recycled back to the transalkylation reactor 50 via stream 47 after benzene is removed or added, shown as stream 56. In certain embodiments added benzene includes stream 28 from the aromatic complex in FIG. 1B. The $C_8+$ aromatics bottoms stream 54 is passed to a second separation column 58 from which an overhead stream 59 containing ethylbenzene and xylenes is directed to a para-xylene unit 79 to produce a para-xylene stream 80. In certain embodiments the para-xylene unit 79 can operate similar to the para-xylene extraction unit 36, the xylene isomerization unit 40, or both the para-xylene extraction unit 36, the xylene isomerization unit 40. In further embodiments the para-xylene unit 79 be the para-xylene extraction unit 36, the xylene isomerization unit 40, or both the para-xylene extraction unit 36.

A bottoms C$_9$+ alkylaromatics stream 60 is withdrawn from the second separation column 58. The side-cut toluene stream 55 is ultimately passed to a second transalkylation unit 66 via stream 68 after toluene is added or removed, shown as stream 69. In certain embodiments added toluene includes all or a portion of the C$_7$ streams 31 or 38, or the combined stream 32, from the aromatic complex in FIG. 1B. The toluene stream 68 is admixed with the bottoms C$_9$+ alkylaromatics stream 60 to form a combined stream 70 that enters a third separation column 72. The separation column 72 separates the combined stream 70 into a bottoms stream 74 of C$_{11}$+ alkylaromatics ("heavies"), and an overhead stream 73 of C$_9$, C$_{10}$ alkylaromatics, and lighter compounds (including C$_7$ alkylaromatics). The overhead stream 73 is directed to a second transalkylation unit 66, along with a hydrogen stream 67. After contact with a transalkylation catalyst, a second transalkylation effluent stream 75 is directed to a stabilizer column 76 from which an overhead stream 77 of light end hydrocarbons ("light-ends gas", generally comprising at least ethane) is recovered, and a bottom stream 78 of the second transalkylation product is directed to the first separation column 52. All, a major portion, a significant portion or a substantial portion of the bottoms stream 74 of C$_{11}$+ alkylaromatics can be passed to an aromatic complex bottoms treatment zone 81 shown and described in conjunction with FIGS. 2A and 2B described herein.

The bottoms fraction 20 from the aromatic complex 19 is subjected to additional processing steps, and in certain embodiments separation and processing steps, to recover additional aromatic products and/or gasoline blending material. For instance, all or a portion of the C$_9$+ heavy fraction 20 from the xylene re-run unit 34 is converted. In additional embodiments in which transalkylation is incorporated, all or a portion of a bottoms stream 74 of C$_{11}$+ alkylaromatics from the separation column 72 can be processed to recover additional aromatic products and/or gasoline blending material. While FIGS. 1A-1B, and optionally FIGS. 1A-1B in combination with FIG. 1C, show embodiments of conventional systems and processes for reforming and separation of aromatic products and gasoline products, C$_9$+ heavy fractions derived from other reforming and separation processes can be suitable as feeds in the systems and processes described herein, for instance, pyrolysis gasoline from steam cracking having condensed aromatics such as naphthalenes.

Characterizations of aromatic complex bottoms show that C$_9$+ mixtures include for example about 75-94 W % of mono-aromatics, about 4-16 W % of di, tri and tetra-aromatics, and about 2-8 W % of other components containing an aromatic ring. The two-plus ring aromatics include alkyl-bridged non-condensed di-aromatics (1), for instance 55-75, 60-70 or 65 W %, and condensed diaromatics (2) as shown below. For the C$_{11}$+ heavy fractions of aromatic complex bottoms, the mixtures include, for example, about 9-15 W % of mono-aromatics, about 68-73 W % of di, tri and tetra-aromatics, and about 12-18 W % of other components containing an aromatic ring.

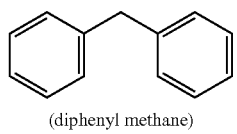

(diphenyl methane)

(1)

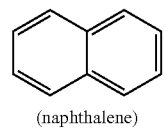

(naphthalene)

(2)

Non-condensed diaromatic rings, connected by an alkyl bridge, are commonly formed in the clay treating step prior to the pare-xylene units of the aromatic recovery complex to remove olefins and diolefins. The clay treating process utilizes a clay, which has Lewis acid sites that acts as a catalyst at temperatures of about 200° C. In the process, olefinic molecules such as alkenyl aromatics react with alkylaromatics via a Friedel-Crafts reaction to form molecules having two aromatic rings connected by an alkyl bridge as shown below, (3). In this reaction, styrene reacts with benzene to form diphenylmethane, which is a non-condensed diaromatic molecule:

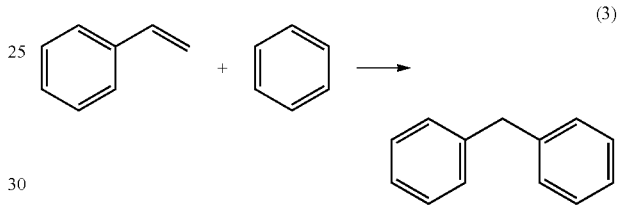

(3)

In addition to the alkylation reaction, it was reported that butyl benzene can be converted to naphthalene, a condensed diaromatic, through cyclization reactions, (4) (Kari Vahteristo Ph.D. Thesis entitled "Kinetic modeling of mechanisms of industrially important organic reactions in gas and liquid phase, University of Technology, Lappeenranta, Finland, Nov. 26, 2010).

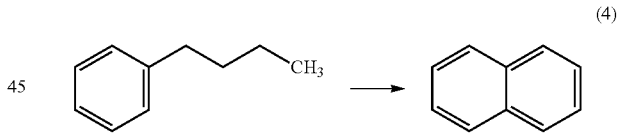

(4)

Formation of condensed diaromatics after the clay treaters was also observed. The diaromatic compounds have properties that are not suitable for gasoline blending components. For example, diphenylmethane has a density of 1.01 Kg/lt, brown color (Standard Reference Method Color greater than 20), and a boiling point of 264° C. Similarly, naphthalene has a density of 1.14 Kg/lt, and a boiling point of 218° C. These properties are not suitable as gasoline blending components.

In a typical refining operation, these multi-aromatics are usually separated from the unreacted alkylaromatics by fractionation, with at least one low-boiling point (or light) fraction containing reduced levels of olefins and at least one high-boiling point (or heavy) fraction containing the multi-aromatics along with high boiling point alkylaromatics. The heavy fraction containing the multi ring-aromatics may be utilized as a stream for gasoline blending because it has a relatively high octane, however the high density, color and boiling point, limit its portion of the blend to relatively low fractions. Where the heavy fraction containing the multi-aromatics is not sent for gasoline blending, it is typically utilized as fuel oil.

The heavy fraction containing the multi ring-aromatics is typically not processed in catalytic units such as a toluene/$C_9/C_{10}$ transalkylation unit, as associated condensed multi-aromatics in the heaviest fractions with greater than 10 carbon atoms tend to form catalyst-deactivating coke layers at the conditions used in such systems, limiting catalyst life between regenerations. Conversion of multi-aromatics into alkylaromatics retains their high octane for gasoline blending, while greatly improving the density, color and boiling point properties. Conversion of the multi-aromatics into alkylaromatics allows for their use as feedstock within BTX/BTEX petrochemicals units directly, or as feedstock to a toluene/C9/C10 transalkylation unit for the fraction of the produced alkylaromatics with carbon numbers greater than $C_8$. Table 1 shows properties and composition of a bottoms stream obtained from an aromatic recovery complex, both where a transalkylation unit is not installed, and where a transalkylation unit is installed. When a transalkylation unit is used, the aromatic bottoms stream was found to have only 15 W % of mono-aromatics and 63 W % diaromatics.

TABLE 1

| Property | | Feedstock - Aromatic Bottoms (no TA) | Tops Gasoline - IBP - 180° C. | Bottoms Distillate - 180° C.+ | Feedstock - Aromatic Bottoms (TA) |
|---|---|---|---|---|---|
| Density | g/cc | 0.8838 | 0.8762 | 0.9181 | 0.9819 |
| Octane Number (ASTM D2799) | | — | 110 | — | — |
| Cetane Index | | — | — | — | 12 | — |
| IBP | ° C. | 153 | 67 | 167 | 198 |
| 5 W % | ° C. | 162 | 73 | 176 | 207 |
| 10 W % | ° C. | 163 | 73 | 181 | 211 |
| 30 W % | ° C. | 167 | 76 | 192 | 236 |
| 50 W % | ° C. | 172 | 77 | 199 | 275 |
| 70 W % | ° C. | 176 | 79 | 209 | 303 |
| 90 W % | ° C. | 191 | 81 | 317 | 332 |
| 95 W % | ° C. | 207 | 81 | 333 | 351 |
| FBP | ° C. | 333 | 83 | 422 | 445 |
| Paraffins/naphthenes | W % | 0 | — | — | 0.4 |
| Mono-aromatics | W % | 94.1 | — | — | 15.2 |
| Naphthenic mono-aromatics | W % | 0.9 | — | — | 9.4 |
| Di-aromatics | W % | 3.7 | — | — | 61.3 |
| Naphthenic di-aromatics | W % | 0.9 | — | — | 7.5 |
| Tri+ Aromatics | W % | 0.3 | — | — | 4.5 |

As noted herein, the feed 20 to an aromatic complex bottoms treatment zone 81 can be an aromatic complex bottoms stream or a heavy portion thereof. In certain embodiments the feed to the aromatic complex bottoms treatment zone 81 is undiluted by a solvent. Such feeds can include, single-ring aromatics with at least three additional carbon atoms (for example one 3 carbon alkyl group, three 1 carbon alkyl groups, one 2 carbon alkyl group and one 1 carbon alkyl group, or combinations thereof). In certain embodiments the feed 20 can include a major portion, a significant portion or a substantial portion of such single-ring aromatics with one or more alkyl groups containing three carbon atoms. In addition, the feed 20 can include alkyl bridged non-condensed alkyl multi-aromatic compounds. In certain embodiments the alkyl bridged non-condensed alky-laromatic compounds include at least two benzene rings connected by an alkyl bridge group having at least two carbons, where the benzene rings are connected to different carbons of the alkyl bridge group. In certain embodiments, the alkyl bridged non-condensed alkylaromatic compounds include additional alkyl groups connected to the benzene rings of the alkyl bridged non-condensed alkylaromatic compounds. In certain embodiments, all or a portion of the $C_9$+ heavy fraction 20 from the xylene re-run unit 34 is the feed to the aromatic complex bottoms treatment zone 81. For example, various alkyl bridged non-condensed alkylaromatic compounds may include a mixture of chemical compounds illustrated by formulas (5) (minimum carbon number of 16), (6), (7), and combinations of these compounds.

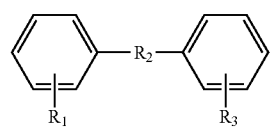

(5)

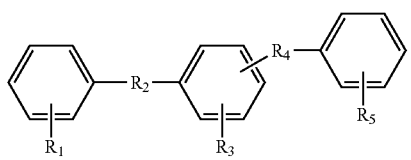

(6)

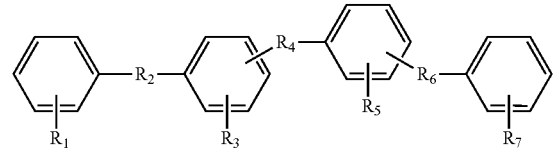

(7)

where: $R_2$, $R_4$, and $R_6$ are alkyl bridge groups independently having from two to six carbon atoms; $R_1$, $R_3$, $R_5$, and $R_7$ are independently selected from the group consisting of hydrogen and an alkyl group having from one to eight carbon atoms. In addition to the groups $R_1$, $R_3$, $R_5$, and $R_7$, the benzene groups of formulas (5), (6), and (7) may further include additional alkyl groups connected to the benzene groups, respectively. The total carbon number for non-condensed alkylaromatic compounds of the formula (5) herein is at least 16. In addition to the four benzene groups of formula (7), the various alkyl bridged non-condensed alkylaromatic compounds may include five or more benzene groups connected by alkyl bridges, where the additional benzene groups further may include alkyl groups connected to the additional benzene groups.

Figure 2A:
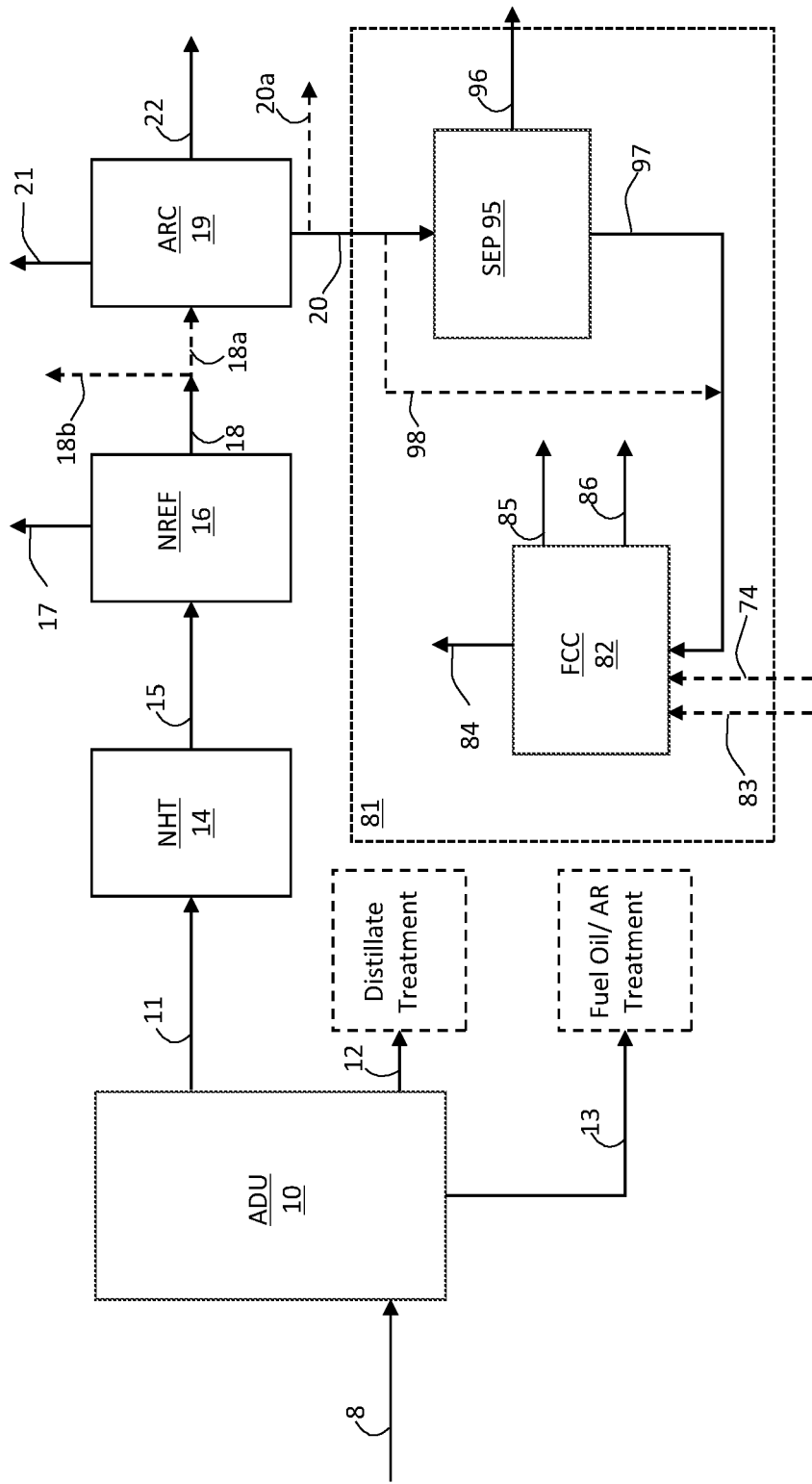
FIG. 2A is a schematic process flow diagram of an embodiment of a system in which aromatic bottoms are separated and passed to an FCC unit for further conversion into gasoline blending components and other products.

FIG. 2A schematically shows units and operations similar to FIG. 1A upstream of the aromatic complex 19, using like reference numerals for like units or streams. FIG. 2A is a schematic process flow diagram of a refinery including conversion of naphtha into gasoline and aromatic products. The refinery includes units similar to those described with respect to FIG. 1A: an atmospheric distillation column 10, a naphtha hydrotreating zone 14 and a catalytic reforming zone 16. The aromatic complex 19 is also included that produces the gasoline pool stream(s) 21, the aromatic products stream(s) 22, and the aromatic complex bottoms stream 20. In certain embodiments, a portion of stream 20, shown as stream 20a (in dashed lines), is diverted. A separation zone 95 is provided having one or more inlets in fluid communication with the aromatic bottoms stream 20 outlet(s), one or more outlets for discharging a tops stream 96, and one or more outlets for discharging a bottoms stream 97. The separation zone 95 can include a distillation column (for example having 5 or more theoretical trays), a flash unit and/or a stripper. The aromatic complex bottoms treatment zone 81 is provided to utilize and convert a portion of the aromatic complex bottoms stream 20, bottoms stream 97, into additional fuel and/or petrochemical products or blending components.

In certain embodiments the quantity, quality and nature of the tops fraction 96 is such that it can be used as gasoline blending components without further treatment, and separation is carried out accordingly. In certain embodiments, the tops stream 96 contains hydrocarbons boiling in the naphtha/naphtha range, and the bottoms stream 97 contains hydrocarbons boiling above the naphtha range. In certain embodiments, the tops stream 96 contains $C_9$ components, and the bottoms stream 97 containing $C_{10}+$ components. In certain embodiments, the tops stream 96 contains $C_9$ and $C_{10}$ components, and the bottoms stream 97 contains $C_{11}+$ components. In certain embodiments, the tops stream 96 contains about 50-99 wt. % of the $C_9$ and $C_{10}$ compounds. In another embodiment, the tops stream 96 contains about 60-99 wt. % of the $C_9$ and $C_{10}$ compounds. In an embodiment, the tops stream 96 contains about 80-99 wt. % of the $C_9$ and $C_{10}$ compounds. In certain embodiments the tops fraction comprises naphtha range hydrocarbons and the bottoms fraction comprises diesel range hydrocarbons. In certain embodiments the tops fraction comprises one or more gasoline fractions and the bottoms fraction comprises hydrocarbons boiling above the gasoline fractions. The bottoms stream 97 is in fluid communication with the aromatic complex bottoms treatment zone 81. In optional embodiments, or on an as-needed basis, aromatic bottoms stream 20 outlet(s) can be in direct fluid communication with the aromatic complex bottoms treatment zone 81 via a slipstream 98 (shown in dashed lines).

All, a major portion, a significant portion or a substantial portion of the heavy aromatic complex $C_9+$ bottoms stream 20 from the aromatic complex containing alkylaromatics (for instance from the xylene rerun unit) is passed to the separation zone 95 for separation into the tops stream 96 containing hydrocarbons boiling in the naphtha/naphtha range and containing $C_9$ and $C_{10}$ components, and the bottoms stream 97 containing hydrocarbons boiling above the naphtha range, such as diesel range distillates, and containing $C_{11}+$ components. All, a major portion, a significant portion or a substantial portion of the bottoms stream 97 is routed to the aromatic complex bottoms treatment zone 81. In certain embodiments, or on an as-needed basis, and as shown in dashed lines, a slipstream 98 which is a portion of the aromatic complex bottoms stream 20 is routed directly to the aromatic complex bottoms treatment zone 81. For instance, portion 98 of stream 20 can be in the range of about 0-100, 0-99, 0-95, 0-90, 0-80, 0-70, 0-60, 0-50, 0-40, 0-30, 0-20 or 0-10 V %. Factors that contribute to use and/or quantity of the slipstream 98 include whether the bottoms fraction is $C_{11}+$, for instance when aromatic transalkylation is integrated, gasoline market supply and demand considerations, and the usable gasoline content of stream 20.

Figure 2B:
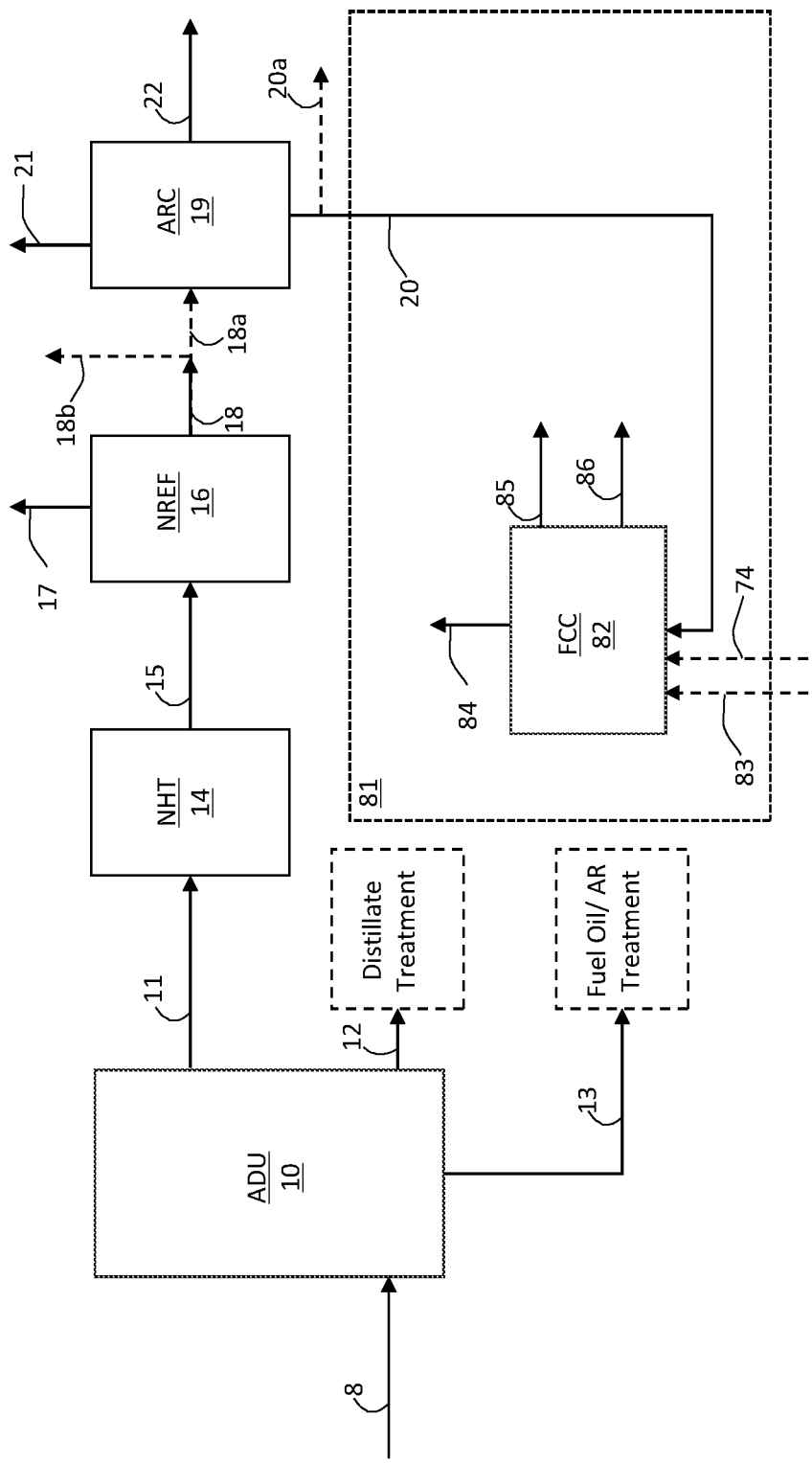
FIG. 2B is a schematic process flow diagram of another embodiment of a system in which aromatic bottoms are passed to an FCC unit for further conversion into gasoline blending components and other products.

With reference to FIG. 2B, units and operations similar to FIG. 1A upstream of the aromatic complex 19 are shown, using like reference numerals for like units. FIG. 2B is a schematic process flow diagram of a refinery including conversion of naphtha into gasoline and aromatic products. The refinery includes units similar to those described with respect to FIG. 1A: an atmospheric distillation column 10, a naphtha hydrotreating zone 14 and a catalytic reforming zone 16. The aromatic complex 19 is also included that produces the gasoline pool stream(s) 21, the aromatic products stream(s) 22, and the aromatic complex bottoms stream 20. In certain embodiments, a portion of stream 20, shown as stream 20a (in dashed lines), is diverted. An aromatic complex bottoms treatment zone 81 is provided to utilize and convert all or a portion of the aromatic complex bottoms stream 20, into additional fuel and/or petrochemical products or blending components. In certain embodiments, all, a major portion, a significant portion or a substantial portion of the aromatic bottoms stream 20 from the aromatic complex containing $C_9+$ alkylaromatics (for instance from the xylene rerun unit) is passed directly to the aromatic complex bottoms treatment zone 81.

In certain embodiments the aromatic complex bottoms treatment zone 81 is also in fluid communication with a source of an additional feedstream 83 (as shown in both FIGS. 2A and 2B in dashed lines). For example, the additional feedstream 83 can comprise one or more feedstocks selected from the group consisting of vacuum gas oil, demetallized oil and/or hydrocracker bottoms, and atmospheric residue. These feeds can be passed to the aromatic complex bottoms treatment zone 81 directly, or in certain embodiments can be subjected to hydrotreating. In certain embodiments, for example when a transalkylation and disproportionation zone as in FIG. 1C or similar thereto is used, the aromatic complex bottoms treatment zone 81 is also in fluid communication with a heavies stream 74 (as shown in both FIGS. 2A and 2B in dashed lines).

Treating the bottoms stream from an aromatic complex includes converting single ring mono alkylaromatics to BTX/BTEX by breaking the alkyl chains, and/or converting alkyl-bridged, non-condensed multi-aromatics by breaking the bridge between the rings. In the present processes and systems, aromatic bottoms stream(s) from the aromatic complex containing $C_9+$ alkylaromatics (for instance from a xylene rerun column), typically considered relatively low-value effluents, is subjected to cracking reactions to produce additional products. A fluidized catalytic cracking (FCC) unit is in fluid communication with the aromatic complex bottoms stream, directly or with an intermediate separator, wherein the FCC unit is operable to crack the inlet stream, the aromatic complex bottoms and/or diesel range hydrocarbons derived from the aromatic complex bottoms, and/or a heavy portion thereof. In certain embodiments the gasoline blending pool contribution is increased according to the process herein.

The aromatic complex bottoms treatment zone 81 as shown in both FIGS. 2A and 2B includes an FCC zone 82 operable to crack alkylaromatics for conversion into one or more additional product streams from which BTX/BTEX and/or suitable gasoline blending components, and other valuable products, are obtained. In certain embodiments, the hydrocarbon feedstock to the FCC zone 82 comprises all or a portion of the aromatic complex bottoms stream that is undiluted by a solvent. The conversion includes breaking the alkyl chains in single ring mono alkylaromatics to produce aromatic products, and/or dearylation to break the bridge between the rings of alkyl-bridged, non-condensed multi-aromatics. The process allows for production of additional aromatic products and/or gasoline blending pool components.

The FCC zone 82 is in certain embodiments an existing unit within a refinery, or in other embodiments can be a grassroots unit, for instance of a scale that is less than that of typical FCC units processing refinery VGO streams. The FCC zone 82 generally comprises reaction, catalyst regeneration and product separation zones, as is conventionally known. The FCC zone 82 includes one or more inlets in fluid communication, via a separator or directly, with the aromatic complex bottoms stream. In the embodiment of FIG. 2A the FCC zone 82 reactor(s) include one or more inlets in fluid communication with the bottoms stream 97 from the separation zone 95 and optionally the slipstream 98 obtained from the bottoms fraction(s) 20. In the embodiment of FIG. 2B the FCC zone 82 reactor(s) include one or more inlets in fluid communication with the aromatic bottoms stream 20. In certain embodiments the FCC zone 82 is in fluid communication with a source of an additional feedstream 83 as indicated by dashed lines. In embodiments in which transalkylation is incorporated, the FCC zone 82 can be in fluid communication with one or more outlets of the separation column 72 discharging the bottoms stream 74 of $C_{11}+$ alkylaromatics, as indicated by dashed lines. As schematically shown, FCC zone 82 also includes plural outlets for discharging, for instance, a gas product stream 84 including $C_2$-$C_4$ olefins and other gases (which can be separated into multiple streams, not shown, including one with $C_2$-$C_4$ olefins, and another with other gases), gasoline and aromatic products stream, FCC naphtha, stream 85 (which can be separated into FCC gasoline and aromatic products, not shown) and a cycle oil stream 86. In certain embodiments, stream 85 includes heavier ends of light naphtha range components and lighter ends of heavy naphtha range components whereby BTX/BTEX components are included, for instance, containing hydrocarbons boiling in the range of about 50-160, 50-150, 50-140, 60-160, 60-150, 60-140, 70-160, 70-150, 70-140, 80-160, 80-150 or 80-140° C.

The FCC zone 82 operates to crack naphthenic and paraffinic bonds of hydrocarbons in the feed, typically not converting double bonds in aromatic rings, to produce an additional product stream 85, from which BTX/BTEX and gasoline blending components can be separated into one or more streams. Light gases $C_1$-$C_4$ paraffins and light $C_2$-$C_4$ olefins are also recovered, as stream 84 (which can be multiple product streams). Cycle oils are also recovered, as stream 86, which can be separated into light and heavy cycle oil, and can be utilized as fuel oil and/or directed to one or more hydroprocessing units within the refinery (for instance in combination with streams 12 and/or 13) for example, to enhance production of additional diesel and/or jet fuel.

In certain embodiments, the FCC zone 82 is operated under conditions and using catalyst to favor production of single ring aromatics with alkyl groups containing one or two carbon atoms, including toluene, xylenes and/or ethylbenzene, and light olefins. In certain embodiments, single ring aromatics with alkyl groups containing two carbon atoms comprise 5-40, 10-40, 15-40, 5-30, 10-30, 15-30, 5-20, or 10-20 W % of the FCC product based on the FCC fresh feed mass. In certain embodiments, the FCC zone 82 can be operated as a conventional FCC unit tailored to produce gasoline as a main product and light gases and cycle oils as secondary products, or at higher severities, for instance higher temperatures.

In operation of the system depicted in FIG. 2A, the FCC zone 82 receives all or a portion of the bottoms stream 97 from the separation zone 95, and in certain embodiments also the stream 98 (shown in dashed lines), derived from the aromatic bottoms stream 20. In operation of the system shown in FIG. 2B, the FCC zone 82 receives all or a portion of the aromatic bottoms stream 20. In certain embodiments (as shown in both FIGS. 2A and 2B in dashed lines) the FCC zone 82 also receives an additional feedstream 83. For example, an additional feedstream 83 can comprise one or more known FCC feedstocks selected from the group consisting of vacuum gas oil, demetallized oil and/or hydrocracker bottoms in typical FCC units, and atmospheric residue in residue FCC units. In certain embodiments, a heavy feedstream such as vacuum gas oil is added to increase coke on the FCC catalyst if necessary. In additional embodiments in which transalkylation is incorporated, all or a portion of a bottoms stream 74 of $C_{11}+$ alkylaromatics from the separation column 72 can be directed to the FCC zone 82. In certain embodiments the bottoms stream 74 is a major portion, a significant portion, a substantial portion feed or all of the feed to the FCC zone 82. These feeds can be passed to the FCC zone 82 directly, or in certain embodiments can be subjected to hydrotreating to increase cracking performance.

The FCC zone 82 generally produces gasoline, cycle oil, light olefins and other gases. Separated effluents include the gas product stream 84 representing $C_2$-$C_4$ olefins and other gases, the product stream 85 (for instance FCC naphtha), and the cycle oil stream 86 which includes light and heavy cycle oil. In addition, the product stream 85 can be further separated, for instance, into an FCC gasoline stream and an aromatics stream, for instance, with an aromatics separation section within or downstream of the FCC zone 82. In certain embodiments, all or any portion (wherein the portion can be divided by volume or by aromatic content) of the product stream 85 is routed to the aromatic complex 19 for separation into gasoline and aromatic products. In embodiments in which FCC gasoline is separated from the product stream 85, the benzene content of the FCC gasoline is less than or equal to about 3 V % or about 1 V %. In certain embodiments, all, a major portion, a significant portion or a substantial portion of product stream 85 (wherein the portion can be divided by volume or by aromatic content) is directed to the hydrotreating zone 14 and/or the catalytic reforming zone 16. In certain embodiments, all, a major portion, a significant portion or a substantial portion of product stream 85 (wherein the portion can be divided by volume or by aromatic content) is directed to the reformate splitter 24 and/or to a heavy reformate splitter 30 as shown in FIG. 1B. In certain embodiments the product stream 85 is rich in naphthenes, paraffins and mono-aromatics, and all or a portion (wherein the portion can be divided by volume or by aromatic content) can be recycled back to the catalytic reforming zone 16 for dehydrogenation of dealkylated rings to produce additional BTX/BTEX and gasoline blending components.

The FCC zone 82 includes, as is typical, a regeneration section in which cracking catalysts that have become coked, and hence access to the active catalytic sites becomes limited or nonexistent, are subjected to high temperatures and a source of oxygen to combust the accumulated coke and steam to strip heavy oil adsorbed on the spent catalyst. While arrangements of certain FCC units are described herein with respect to FIGS. 3 and 4, one of ordinary skill in the art will appreciate that other well-known FCC units can be employed.

In certain embodiments, the primary feed to the FCC zone 82 is derived from stream 83, and wherein the aromatic complex bottoms 20 and/or the heavy portion 97 and/or the heavies stream 74 comprise a minor portion of the total FCC unit feed. In other embodiments, the FCC zone 82 is designed to treat the aromatic complex bottoms 20 and/or the heavy portion 97 and/or the heavies stream 74 which form a major portion, a significant portion or a substantial portion of the total feed to the FCC zone 82, and accordingly in such embodiments any additional feed 83 is considered secondary. In further embodiments, the system is closed so that the feed to the FCC zone 82 consists of or consists essentially of the aromatic complex bottoms 20 and/or the heavy portion 97 and/or the heavies stream 74, for instance, as a dedicated grassroots unit. In certain embodiments, in which the feed to the FCC zone comprises all or a portion of the heavy portion 97, alone or in combination with an additional feed 83, use of the slipstream 98 containing the lighter $C_9+$ components could compensate for excess coking in the FCC catalyst regeneration step.

FCC processes typically are used to catalytically crack the petroleum derived hydrocarbons boiling in vacuum gas oil range, with an acidic catalyst maintained in a fluidized state, which is regenerated on a continuous basis. The main product from such processes has conventionally been gasoline. Other products are also produced in smaller quantities via FCC processes such as light hydrocarbons gases, $C_1$-$C_4$, unconverted cycle oils and coke deposited on the catalyst is burned off at high temperatures and in the presence of air prior to recycling regenerated catalyst back to the reaction zone.

With reference to FIG. 3A, a generalized process flow diagram is provided of an FCC zone 188 which includes a downflow reactor and can be used in the system and process according to the present disclosure. FCC zone 188 includes a reactor/separator 110 having a reaction zone 114 and a separation zone 116. FCC zone 188 also includes a regeneration zone 118 for regenerating spent catalyst. FCC zone 188 can be operated under conditions tailored to produce FCC gasoline, cycle oil and olefin by-products, or under conditions tailored to promote formation of olefins and that minimizes olefin-consuming reactions, such as hydrogen-transfer reactions.

A charge 120 corresponding to the additional treatment zone 81 feedstreams disclosed with respect to FIGS. 2A and 2B is directed to the FCC zone 188. For instance, the feed can be the stream 97, optionally in combination with stream 98 obtained from the bottoms fraction(s) 20, optionally in combination with another feed 83, and/or optionally in combination with heavies 74 in embodiments in which transalkylation is used, as shown and described with respect to FIG. 2A. Alternatively, the feed can be stream 20, optionally in combination with another feed 83, and/or optionally in combination with heavies 74 in embodiments in which transalkylation is used, as shown and described with respect to FIG. 2B. The charge 120 is introduced to the reaction zone, in certain embodiments also accompanied by steam or other suitable gas for atomization of the feed. In addition an effective quantity of heated fresh solid cracking catalyst particles (not shown) or hot regenerated solid cracking catalyst particles from regeneration zone 118 is also transferred, for instance, through a downwardly directed conduit or pipe 122, commonly referred to as a transfer line or standpipe, to a withdrawal well or hopper at the top of reaction zone 114. Hot catalyst flow is typically allowed to stabilize in order to be uniformly directed into the mix zone or feed injection portion of reaction zone 114.

The charge 120 is injected into a mixing zone through feed injection nozzles typically situated proximate to the point of introduction of the regenerated catalyst into reaction zone 114. These multiple injection nozzles result in the catalyst and oil mixing thoroughly and uniformly. Once the charge contacts the hot catalyst, cracking reactions occur. The reaction vapor of hydrocarbon cracked products, unreacted feed and catalyst mixture quickly flows through the remainder of reaction zone 114 and into a rapid separation zone 116 at the bottom portion of reactor/separator 110. Cracked and uncracked hydrocarbons are directed through a conduit or pipe 124 to a conventional product recovery section known in the art.

If necessary for temperature control, a quench injection can be provided near the bottom of reaction zone 114 immediately before the separation zone 116. This quench injection quickly reduces or stops the cracking reactions and can be utilized for controlling cracking severity and allows for added process flexibility.

The reaction temperature or the outlet temperature of the downflow reactor, can be controlled by opening and closing a catalyst slide valve that controls the flow of regenerated catalyst from regeneration zone 118 into the top of reaction zone 114. The heat required for the endothermic cracking reaction is supplied by the regenerated catalyst. By changing the flow rate of the hot regenerated catalyst, the operating severity or cracking conditions can be controlled to produce the desired yields of light olefinic hydrocarbons and gasoline.

A stripper 132 is also provided for separating oil from the catalyst, which is transferred to regeneration zone 118. The catalyst from separation zone 116 flows to the lower section of the stripper 132 that includes a catalyst stripping section into which a suitable stripping gas, such as steam, is introduced through line 134. The stripping section is typically provided with several baffles or structured packing over which the downwardly flowing catalyst passes counter-currently to the flowing stripping gas. The upwardly flowing stripping gas, which is typically steam, is used to "strip" or remove any additional hydrocarbons that remain in the catalyst pores or between catalyst particles.

The stripped or spent catalyst is transported through a conduit 126 to the regeneration zone 118, with lift forces from the stream 128 of oxygen-containing gas, such as pure oxygen or air, through a lift riser of the regeneration zone 118. This spent catalyst, which can also be contacted with additional combustion air, undergoes controlled combustion of any accumulated coke. Flue gases are removed from the regenerator via conduit 130. In the regenerator, the heat produced from the combustion of the by-product coke is transferred to the catalyst, raising the temperature required to provide heat for the endothermic cracking reaction in the reaction zone 114.

In general, the operating conditions for the reactor of a suitable downflow FCC unit include:
  reaction temperature (° C.) of about 450-680, 480-680, 510-680, 550-680, 580-680, 590-680, 450-650, 480-650, 510-650, 550-650, 580-650, 590-650, 450-630, 550-630, 580-630, 590-630, 450-620, 550-620, 580-620 or 590-620;
  reaction pressure (bars) of about 1-20, 1-10 or 1-3;
  contact time (seconds, in the reactor) of about 0.1-30, 0.2-30, 0.1-10, 0.2-10, 0.1-5, 0.2-5, 0.1-0.7 or 0.2-0.7; and
  a catalyst to feed ratio (on a mass basis) of about 1:1-40:1, 3:1-40:1, 8:1-40:1, 1:1-30:1, 3:1-30:1, 8:1-30:1, 1:1-20:1, 3:1-20:1, 8:1-20:1, 1:1-15:1, 3:1-15:1, 8:1-15:1, 1:1-10:1, 3:1-10:1.

In certain embodiments, an FCC unit configured with a riser reactor is provided, which can be operated under conditions tailored to produce FCC gasoline, cycle oil and olefin by-products, or under conditions tailored to promote formation of olefins and that minimizes olefin-consuming reactions, such as hydrogen-transfer reactions. FIG. 3B is a generalized process flow diagram of an FCC zone 288 which includes a riser reactor and can be used in the system and process according to the present disclosure. FCC zone 288 includes a reactor/separator 210 having a riser portion 212, a reaction zone 214 and a separation zone 216. The FCC zone 288 also includes a regeneration vessel 218 for regenerating spent catalyst.

A charge 220 corresponding to the additional treatment zone 81 feedstreams disclosed with respect to FIGS. 2A and 2B is directed to the FCC 288. For instance, the feed can be the stream 97, optionally in combination with stream 98 obtained from the bottoms fraction(s) 20, optionally in combination with another feed 83, and/or optionally in combination with heavies 74 in embodiments in which transalkylation is used, as shown and described with respect to FIG. 2A. Alternatively, the feed can be stream 20, optionally in combination with another feed 83, and/or optionally in combination with heavies 74 in embodiments in which transalkylation is used, as shown and described with respect to FIG. 2B.

The charge 220 is conveyed for admixture and intimate contact with an effective quantity of heated fresh or regenerated solid cracking catalyst particles via a conduit 222 from regeneration vessel 218. In certain embodiments the feed is accompanied by steam or other suitable gas for atomization of the feed. The feed mixture and the cracking catalyst are contacted under conditions to form a suspension that is introduced into the riser 212. In a continuous process, the mixture of cracking catalyst and hydrocarbon feedstock proceed upward through the riser 212 into reaction zone 214. In riser 212 and reaction zone 214, the hot cracking catalyst particles catalytically crack relatively large hydrocarbon molecules by carbon-carbon bond cleavage. During the reaction, as is conventional in FCC operations, the cracking catalysts become coked and hence access to the active catalytic sites is limited or nonexistent. Reaction products are separated from the coked catalyst using any suitable configuration known in FCC units, generally referred to as the separation zone 216 in FCC zone 288, for instance, located at the top of the reactor 210 above the reaction zone 214. The separation zone can include any suitable apparatus known to those of ordinary skill in the art such as, for example, cyclones. The reaction product is withdrawn through conduit 224.

Catalyst particles containing coke deposits from fluid cracking of the hydrocarbon feedstock pass from the separation zone 214 through a conduit 226 to regeneration zone 218. In regeneration zone 218, the coked catalyst comes into contact with a stream of oxygen-containing gas, such as pure oxygen or air, which enters regeneration zone 218 via a conduit 228. The regeneration zone 218 is operated in a configuration and under conditions that are known in typical FCC operations. For instance, regeneration zone 218 can operate as a fluidized bed to produce regeneration off-gas comprising combustion products which is discharged through a conduit 230. The hot regenerated catalyst is transferred from regeneration zone 218 through conduit 222 to the bottom portion of the riser 212 for admixture with the hydrocarbon feedstock as noted above.

In general, the operating conditions for the reactor of a suitable riser FCC unit include:

reaction temperature (° C.) of about 450-680, 480-680, 510-680, 550-680, 580-680, 590-680, 450-650, 480-650, 510-650, 550-650, 580-650, 590-650, 450-630, 550-630, 580-630, 590-630, 450-620, 550-620, 580-620 or 590-620;

reaction pressure (bars) of about 1-20, 1-10 or 1-3;

contact time (seconds, in the reactor) of about 0.7-10, 0.7-5, 0.7-2, 1-10, 1-5 or 1-2; and a catalyst to feed ratio (on a mass basis) of about 1:1-40:1, 3:1-40:1, 8:1-40:1, 1:1-30:1, 3:1-30:1, 8:1-30:1, 1:1-20:1, 3:1-20:1, 8:1-20:1, 1:1-15:1, 3:1-15:1, 8:1-15:1, 1:1-10:1, 3:1-10:1 or 8:1-10:1.

A catalyst that is suitable for the particular charge and the desired product is conveyed to the FCC reactor within the FCC reaction and separation zone. In certain embodiments the FCC catalyst includes a solid acid catalyst suitable for cracking hydrocarbons to yield light olefins. For example, suitable solid acid catalysts are Lewis acids, Brnsted acids or a mixture thereof. FCC catalyst systems can be used with or without FCC catalyst additive to maximize olefin yield. In certain embodiments an FCC catalyst mixture is used in the FCC reaction and separation zone, including an FCC base catalyst and an FCC catalyst additive. In particular, a matrix of a base cracking catalyst can include one or more clays such as kaolin, montmorillonite, halloysite and bentonite, and/or one or more inorganic porous oxides such as alumina, silica, boria, chromia, magnesia, zirconia, titania and silica-alumina. The base cracking catalyst preferably has a bulk density of about 0.5-1.0 g/ml, an average particle diameter of about 50-90 microns, a surface area of about 50-350 $m^2$/g and a pore volume of about 0.05-0.5 ml/g. A suitable catalyst mixture contains, in addition to a base cracking catalyst, an FCC catalyst additive. The FCC catalyst additive can include a suitable shape-selective zeolite. The shape selective zeolite referred to herein means a zeolite whose pore diameter is smaller than that of Y-type zeolite, so that hydrocarbons with only limited shape can enter the zeolite through its pores. Suitable shape-selective zeolite components include ZSM-5 zeolite, zeolite omega, SAPO-5 zeolite, SAPO-11 zeolite, SAPO-34 zeolite, and pentasil-type aluminosilicates. In certain embodiments the FCC catalyst additive includes MFI zeolite. The content of the FCC catalyst additive in the additive can be in the range of about 0-70, 5-70, 20-70, 30-70, 0-60, 5-60, 20-60, 30-60, 0-40, 5-40 or 20-40 W % (based on the total mass of the mixture of catalyst and additive). In certain embodiments the FCC catalyst additive has a bulk density of about 0.5-1.0 g/ml, an average particle diameter of about 50-90 microns, a surface area of about 10-100 $m^2$/g and a pore volume of about 0.01-0.3 ml/g.

In certain embodiments, the FCC catalyst and/or the catalyst support is prepared in accordance with U.S. Pat. No. 10,357,761 (jointly owned by the owner of the present application, and subject to a joint research agreement), which is incorporated herein by reference in its entirety. The material includes a modified zeolite support having one or more of Ti, Zr and/or Hf substituting the aluminum atoms constituting the zeolite framework thereof. For instance, an effective FCC catalyst can include a framework-substituted zeolite such as a ultra-stable Y-type zeolite, in which a part of aluminum atoms constituting a zeolite framework thereof is substituted one, two or all of Ti, Zr and Hf, for instance 0.1-5 mass % of each calculated on an oxide basis.

Example: A 5.514 kg sample of an aromatic bottoms stream from an aromatic complex associated with a catalytic reformer is distilled on a laboratory scale true boiling point distillation column with 15 or more theoretical plates using ASTM method D2917. The aromatic bottoms stream was fractioned into 3.109 kg (56.56 W %) of a gasoline fraction boiling in the range of the IBP, theoretically 36, to 180° C., and 2.396 kg (43.44 W %) of a middle and heavy distillate fraction boiling above 180° C. The gasoline fraction was analyzed for its content and octane numbers. Properties and composition of the feed, gasoline fraction and diesel fraction are shown in Table 2.

FIG. 4 shows a schematic diagram with reference numbers corresponding to those in FIG. 2A for illustration of material balances in the examples. The aromatic bottoms stream 20 is passed to the separation zone 95 to recover the tops gasoline stream 96 and the bottoms middle and heavy distillate stream 97. The bottoms middle and heavy distillate stream 97 is routed to the FCC zone 82 to produce a gas stream 84a including $C_2$-$C_4$ olefins, a gas stream 84b including other gases, an FCC gasoline and aromatics stream 85, and a cycle oil stream 86.

TABLE 2

| Property | Feedstock - Aromatic Bottoms | Tops Gasoline - IBP - 180° C. | Bottoms Distillate - 180° C.+ |
| --- | --- | --- | --- |
| Density | 0.9125 | 0.873 | 0.9226 |
| Octane Number ASTM 02799 | — | 107 | — |
| Cetane Index | — | — | 16 |
| IBP | 182 | 153 | 164 |
| 5 W % | 183 | 161 | 182 |
| 10 W % | 183 | 162 | 184 |
| 30 W % | 184 | 163 | 197 |
| 50 W % | 208 | 169 | 222 |
| 70 W % | 302 | 171 | 322 |
| 90 W % | 330 | 184 | 340 |
| 95 W % | 337 | 184 | 346 |
| FBP | 350 | 251 | 455 |
| Paraffins | 1.00 | | |
| Mono-Aromatics | 74.60 | | |
| Naphtheno Mono-Aromatics | 3.06 | | |
| Di-Aromatics | 15.36 | | |
| Naphtheno Di-Aromatics | 5.21 | | |
| Tri-Aromatics | 0.59 | | |
| Tetra-Aromatics | 0.18 | | |

Example 1: Conventional FCC conditions are utilized to determine the additional yield of gasoline, and also yields of light olefins and cycle oil, using the system of the present disclosure, compared to typical treatment of heavy aromatic bottoms from the aromatics recovery center. The bottoms fraction from the distillation (diesel boiling range material) was subjected to catalytic cracking using a Micro Activity Test (MAT) unit. The MAT tests were conducted in a fixed-bed reactor according to ASTM Standard Test Method D5154 "Determining Activity and Selectivity of FCC Catalysts by Microactivity Test." A CAN-FCC catalyst was used for the tests as disclosed in U.S. Pat. No. 10,357,761, which is incorporated herein by reference. The catalyst was conditioned using the ASTM D4463 method "Metals Free Steam Deactivation of Fresh Fluid Cracking Catalyst". According to this method, the catalyst was aged at 810° C. and ambient pressure under a flow of 100% steam for 6 hours. Three tests were conducted at the catalyst to oil ratio of approximately 6, and at conventional FCC conditions of 515° C. Table 3 provides the test results and material balance data (on a coke free basis). The material balance is based on an initial reformate production of 100,000 kg, of which about 15% is typically rejected as heavy aromatic bottoms.

TABLE 3

| | Test #1 | Test #2 | Test #3 | Average |
| --- | --- | --- | --- | --- |
| Temperature (° C.) | 515 | 515 | 515 | 515 |
| Catalyst to Oil Ratio | 6.0:1 | 5.8:1 | 5.9:1 | 5.9:1 |
| Heavy Aromatic Bottoms 20 (kg) | 15,000 | 15,000 | 15,000 | 15,000 |
| Gasoline Fraction 96 (kg) | 8,484 | 8,484 | 8,484 | 8,484 |
| Diesel Fraction 97 (kg) | 6516 | 6,516 | 6,516 | 6,516 |
| $C_2$-$C_4$ Olefins 84a (kg) | 346 | 318 | 312 | 325 |
| Other Gases 84b (kg) | 240 | 235 | 225 | 233 |
| FCC Gasoline and Aromatics 85 | 4189 | 4177 | 4200 | 4189 |
| Cycle Oil 86 | 1741 | 1785 | 1779 | 1768 |

It is apparent from Example 1, compared to systems in which aromatic complex bottoms are rejected, based on 100,000 kg of reformate, an additional 12,673 kg of high quality gasoline was produced, along with 325 kg of light olefins. Product analysis conducted by two-dimensional gas chromatography (GC×GC) is shown in Table 4, demonstrating a significant amount of xylenes and ethyl benzenes.

TABLE 4

| Component | Feedstock, W % | Product, W % |
| --- | --- | --- |
| Benzene | 0.00 | 0.42 |
| Toluene | 0.04 | 2.97 |
| Xylenes, ethylbenzenes | 0.35 | 23.62 |

Example 2: High severity FCC conditions are utilized to determine the additional yield of gasoline, and also yields of light olefins and cycle oil, using the system of the present disclosure, compared to typical treatment of heavy aromatic bottoms from the aromatics recovery center. The bottoms fraction from the distillation (diesel boiling range material) was subjected to catalytic cracking using a Micro Activity Test (MAT) unit. The MAT tests were conducted in a fixed-bed reactor according to ASTM Standard Test Method D5154 "Determining Activity and Selectivity of FCC Catalysts by Microactivity Test." A CAN-FCC catalyst was used for the tests as disclosed in U.S. Pat. No. 10,357,761, which is incorporated herein by reference. The catalyst was conditioned using the ASTM D4463 method "Metals Free Steam Deactivation of Fresh Fluid Cracking Catalyst". According to this method, the catalyst was aged at 810° C. and ambient pressure under a flow of 100% steam for 6 hours. Four tests were conducted at the catalyst to oil ratios of approximately 6, 5, 4 and 3, and at temperature conditions that are higher than the temperature of 515° C. set by the ASTM Standard Test Method D5154, 600° C. Table 5 provides the test results and material balance data (on a coke free basis). The material balance is based on an initial reformate production of 100,000 kg, of which about 15% is typically rejected as heavy aromatic bottoms.

TABLE 5

| | Test #1 | Test #2 | Test #3 | Test #4 |
| --- | --- | --- | --- | --- |
| Temperature (° C.) | 600 | 600 | 600 | 600 |
| Catalyst to Oil Ratio | 6.3:1 | 4.9:1 | 3.9:1 | 3.0:1 |
| Heavy Aromatic Bottoms 20 (kg) | 15,000 | 15,000 | 15,000 | 15,000 |
| Gasoline Fraction 96 (kg) | 8,484 | 8,484 | 8,484 | 8,484 |
| Diesel Fraction 97 (kg) | 6516 | 6516 | 6516 | 6516 |
| $C_2$-$C_4$ Olefins 84a (kg) | 546 | 488 | 437 | 390 |
| Other Gases 84b (kg) | 456 | 345 | 294 | 231 |
| FCC Gasoline and Aromatics 85 | 3607 | 3729 | 3873 | 3918 |
| Cycle Oil 86 | 1905 | 1954 | 1912 | 1977 |

It is apparent from Example 2, compared to systems in which aromatic complex bottoms are rejected, based on 100,000 kg of reformate, in test #1 an additional 12,091 kg of high quality gasoline was produced, along with 546 kg of light olefins. Product analysis conducted by two-dimensional gas chromatography (GC×GC) is shown in Table 6, demonstrating a significant amount of xylenes and ethyl benzenes.

TABLE 6

| Component | Feedstock, W % | Product, W % |
|---|---|---|
| Benzene | 0.00 | 0.98 |
| Toluene | 0.04 | 5.55 |
| Xylenes, ethylbenzenes | 0.35 | 30.94 |

Accordingly, processing the aromatic bottoms stream within the refinery as disclosed improves its quality. By using an existing FCC unit, or integrating a new grassroots FCC unit, to treat the aromatic bottoms or a heavy fraction (for instance the 180+° C. fraction), additional valuable products are obtained. Alkyl chain aromatics are converted to BTX, and bridged uncondensed diaromatics are converted to mono-aromatics. Typically, 15 V % of the reformate sent to aromatics unit ends up in the aromatic bottoms fraction. Considering 100 MBDP reformate capacity, 15 MBDP of low value aromatic bottoms fraction can be converted to valuable products olefins, BTX and gasoline, reformate blending components and/or fuel production blending components/reactants, resulting in a substantial gain for the refinery.

For the purpose of these simplified schematic illustrations and description, the numerous valves, temperature sensors, electronic controllers and the like that are customarily employed and well known to those of ordinary skill in the art are not included. Accompanying components that are in conventional hydrotreating and reformer units such as, for example, bleed streams, spent catalyst discharge sub-systems, and catalyst replacement sub-systems are also not shown. Further, accompanying components that are in conventional FCC systems such as, for example, air supplies, catalyst hoppers and flue gas handling are not shown.

The methods and systems of the present invention have been described above and in the attached drawings; however, modifications will be apparent to those of ordinary skill in the art and the scope of protection for the invention is to be defined by the claims that follow.

The invention claimed is:
1. A process comprising:
hydrotreating an initial naphtha stream to produce hydrotreated naphtha;
catalytically reforming the hydrotreated naphtha to produce reformate;
passing all or a portion of the reformate to an aromatic complex for separation into gasoline pool components, C6-C8 aromatic products and $C_9+$ aromatic bottoms;
reacting a feedstream comprising all or a portion of the $C_9+$ aromatic bottoms in the presence of a catalyst under specified fluidized catalytic cracking reaction conditions to produce FCC naphtha, light olefins and cycle oil; and
passing all or a portion of the FCC naphtha to the step of hydrotreating the initial naphtha stream.
2. The process as in claim 1, wherein the aromatic complex includes a xylene rerun unit, and wherein the feedstream comprises $C_9+$ alkylaromatics from the xylene rerun unit.
3. The process as in claim 1, further wherein the aromatic complex includes or is in fluid communication with a transalkylation zone for transalkylation of aromatics to produce $C_8$ aromatic compounds and $C_{11}+$ aromatic compounds, and wherein the feedstream comprises all or a portion of the $C_{11}+$ aromatics from the transalkylation zone.
4. The process as in claim 1, further comprising reacting one or more additional streams together with the $C_9+$ aromatic bottoms under the specified fluidized catalytic cracking reaction conditions, wherein the one or more additional streams are selected from a group consisting of vacuum gas oil, demetallized oil, hydrocracker bottoms and atmospheric residue.
5. The process as in claim 1, further comprising passing all or a portion of the FCC naphtha stream to the catalytic reforming step.
6. The process as in claim 1, further comprising passing all or a portion of the FCC naphtha stream to the aromatic complex.
7. The process as in claim 1, wherein the aromatic complex includes a reformate splitter operable to separate reformate into light reformate and heavy reformate, and a heavy reformate splitter operable to separate heavy reformate into $C_7$ components and $C_8+$ components, wherein the $C_9+$ aromatic bottoms are obtained from the $C_8+$ components, and further comprising passing all or a portion of the FCC naphtha the heavy reformate splitter.
8. The process as in claim 1, further comprising separating all or a portion of the FCC naphtha stream into an aromatics stream and an FCC gasoline stream.
9. The process as in claim 1, wherein fluid catalytic cracking is operable to break the alkyl chains in single ring mono alkylaromatics to produce aromatic products, and dearylation to break the bridge between the rings of alkyl-bridged, non-condensed multi-aromatics.
10. The process as in claim 1, further comprising, prior to reacting under specified fluidized catalytic cracking reaction conditions, separating all or a portion of the $C_9+$ aromatic bottoms into a tops fraction and a bottoms fraction, and reacting all or a portion of the bottoms fraction.
11. A process for treatment of $C_9+$ aromatic bottoms obtained from catalytic reforming of naphtha followed by separation in an aromatic complex into a gasoline pool stream, an aromatic products stream and the $C_9+$ aromatic bottoms, the process comprising:
separating all or a portion of the $C_9+$ aromatic bottoms into a tops fraction and a bottoms fraction, wherein (a) the tops fraction comprises $C_9$ and $C_{10}$ aromatic compounds and the bottoms fraction comprises $C_{11}+$ aromatic compounds or (b) the tops fraction comprises $C_9$ aromatic compounds and the bottoms fraction comprises $C_{10}+$ aromatic compounds; and
reacting a feedstream comprising all or a portion of the bottoms fraction in the presence of a catalyst under specified fluidized catalytic cracking reaction conditions to produce an FCC naphtha stream, light olefins and cycle oil.
12. The process as in claim 11, further comprising passing a portion of the $C_9+$ aromatic bottoms to fluidized catalytic cracking.
13. The process as in claim 11, further comprising supplying all or a portion of the tops fraction to a reactor in the presence of a transalkylation catalyst and hydrogen under specified reaction conditions for transalkylation of aromatics to produce $C_8$ aromatic compounds.
14. The process as in claim 11, wherein the tops fraction comprises $C_9$ and $C_{10}$ aromatic compounds and the bottoms fraction comprises $C_{11}+$ aromatic compounds.

15. The process as in claim 11, wherein the tops fraction comprises $C_9$ aromatic compounds and the bottoms fraction comprises $C_{10}+$ aromatic compounds.

16. The process as in claim 11, wherein the tops fraction comprises naphtha range hydrocarbons and the bottoms fraction comprises diesel range hydrocarbons.

17. The process as in claim 11, wherein the aromatic complex includes a xylene rerun unit, and wherein the feedstream comprises $C_9+$ alkylaromatics from the xylene rerun unit.

18. The process as in claim 11, further wherein the aromatic complex includes or is in fluid communication with a transalkylation zone for transalkylation of aromatics to produce $C_8$ aromatic compounds and $C_{11}+$ aromatic compounds, and wherein the feedstream comprises all or a portion of the $C_{11}+$ aromatics from the transalkylation zone.

19. The process as in claim 11, further comprising reacting one or more additional streams together with the feedstream comprising all or a portion of the bottoms fraction under the specified fluidized catalytic cracking reaction conditions, wherein the one or more additional streams are selected from a group consisting of vacuum gas oil, demetallized oil, hydrocracker bottoms and atmospheric residue.

20. The process as in claim 11, further comprising passing all or a portion of the FCC naphtha stream to the catalytic reforming step.

21. The process as in claim 11, further comprising passing all or a portion of the FCC naphtha stream to the aromatic complex.

22. The process as in claim 11, wherein catalytic reforming is preceded by a naphtha hydrotreating zone, and further comprising passing all or a portion of the FCC naphtha stream to the naphtha hydrotreating zone.

23. The process as in claim 11, wherein the aromatic complex includes a reformate splitter operable to separate reformate into light reformate heavy reformate, and a heavy reformate splitter operable to separate heavy reformate into $C_7$ components and $C_8+$ components, wherein the $C_9+$ aromatic bottoms are obtained from the $C_8+$ components, and further comprising passing all or a portion of the FCC naphtha stream to the heavy reformate splitter.

24. The process as in claim 11, further comprising separating all or a portion of the FCC naphtha stream into an aromatics stream and an FCC gasoline stream.

25. The process as in claim 11, wherein fluid catalytic cracking is operable to break the alkyl chains in single ring mono alkylaromatics to produce aromatic products, and dearylation to break the bridge between the rings of alkyl-bridged, non-condensed multi-aromatics.

26. A system comprising:
a naphtha hydrotreating zone comprising one or more reactors for hydrotreating naphtha and including one or more outlets for discharging hydrotreated naphtha;
a catalytic reforming zone comprising one or more reactors and having one or more inlets in fluid communication with the one or more outlets of the naphtha hydrotreating zone for discharging hydrotreated naphtha, one or more outlets for discharging gases containing hydrogen, and one or more outlets for discharging reformate;
an aromatic complex comprising at least one splitter and having one or more inlets in fluid communication with the one or more outlets for discharging reformate, one or more outlets for discharging gasoline pool components, one or more outlets for discharging aromatic products, and one or more outlets for discharging $C_9+$ aromatic bottoms; and
a fluidized catalytic cracking (FCC) zone comprising one or more reactors and having one or more in fluid communication with the one or more outlets for discharging $C_9+$ aromatic bottoms, one or more outlets for discharging gases including light olefins, one or more outlets for discharging FCC naphtha, and one or more outlets for discharging cycle oil, wherein the one or more outlets for discharging FCC naphtha is/are in fluid communication with the naphtha hydrotreating zone.

27. The system as in claim 26, further comprising a separation zone comprising a distillation column, a flash unit and/or stripper, and having one or more inlets in fluid communication with the one or more outlets for discharging $C_9+$ aromatic bottoms, one or more outlets for discharging tops fraction components, and one or more outlets for discharging bottoms fraction components, and wherein the one or more inlets of the FCC zone is in fluid communication with at least one of the one or more outlets of the separation zone for discharging bottoms fraction components.

28. A process for treatment of $C_9+$ aromatics obtained from catalytic reforming of naphtha comprising:
catalytically reforming naphtha to produce reformate;
separating reformate into light reformate and heavy reformate;
separating heavy reformate into $C_7$ components and $C_8+$ components with a heavy reformate splitter;
separating $C_8+$ components into $C_8$ components and $C_9+$ components;
reacting a feedstream comprising all or a portion of the $C_9+$ components in the presence of a catalyst under specified fluidized catalytic cracking reaction conditions to produce FCC naphtha, light olefins and cycle oil; and
passing all or a portion of the FCC naphtha to the heavy reformate splitter.

29. The process as in claim 28, further comprising, prior to reacting under specified fluidized catalytic cracking reaction conditions, separating all or a portion of the $C_9+$ components into a tops fraction and a bottoms fraction, and reacting all or a portion of the bottoms fraction.

30. A system comprising:
a catalytic reforming zone comprising one or more reactors and having one or more inlets in fluid communication with a source of naphtha, one or more outlets for discharging gases containing hydrogen, and one or more outlets for discharging reformate;
at least one splitter comprising a distillation column, a flash unit and/or stripper, and having one or more inlets in fluid communication with the one or more outlets for discharging reformate, one or more outlets for discharging light reformate, and one or more outlets for discharging heavy reformate;
at least one heavy reformate splitter comprising a distillation column, a flash unit and/or stripper, and having one or more inlets in fluid communication with the one or more outlets for discharging heavy reformate, one or more outlets for discharging $C_7$ components, and one or more outlets for discharging $C_8+$ components;
at least one splitter comprising a distillation column, a flash unit and/or stripper, and having one or more inlets in fluid communication with the one or more outlets for discharging $C_8+$ components, one or more outlets for discharging $C_8$ components, and one or more outlets for discharging $C_9+$ components; and
a fluidized catalytic cracking (FCC) zone comprising one or more reactors and having one or more inlets in fluid communication with the one or more outlets for discharging $C_9+$ components, one or more outlets for discharging gases including light olefins, one or more outlets for discharging FCC naphtha, and one or more outlets for discharging cycle oil, wherein the one or more outlets for discharging FCC naphtha is/are in fluid communication with the heavy reformate splitter.

31. The system as in claim 30, further comprising a separation zone comprising a distillation column, a flash unit and/or stripper, and having one or more inlets in fluid communication with the one or more outlets for discharging $C_9+$ components, one or more outlets for discharging tops fraction components, and one or more outlets for discharging bottoms fraction components, and wherein the one or more inlets of the FCC zone is in fluid communication with at least one of the one or more outlets of the separation zone for discharging bottoms fraction components.

* * * * *